United States Patent [19]
Ninomiya

[11] Patent Number: 5,991,839
[45] Date of Patent: *Nov. 23, 1999

[54] COMPUTER SYSTEM HAVING COMPUTER MAIN BODY AND EXPANSION UNIT

[75] Inventor: Ryoji Ninomiya, Tokyo, Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,860

[22] Filed: Sep. 20, 1996

[30] Foreign Application Priority Data

Sep. 29, 1995 [JP] Japan .................................. 7-254221

[51] Int. Cl.⁶ .................................................. G06F 13/00
[52] U.S. Cl. ......................... 710/101; 710/102; 710/128; 710/129; 710/131; 713/300; 713/310; 713/340
[58] Field of Search ........................ 395/750.01, 750.02, 395/750.08, 280, 281, 282, 283, 284, 311, 309, 308; 710/100, 101, 102, 103, 104, 128, 129, 131; 713/300, 310, 340

[56] References Cited

U.S. PATENT DOCUMENTS

| | | | |
|---|---|---|---|
| 5,301,334 | 4/1994 | Horiuchi | 395/281 |
| 5,323,291 | 6/1994 | Boyle et al. | 361/686 |
| 5,377,357 | 12/1994 | Nishigaki et al. | 395/281 |
| 5,394,552 | 2/1995 | Shirota | 395/281 |
| 5,463,742 | 10/1995 | Kobayashi | 295/281 |
| 5,507,661 | 4/1996 | Honda et al. | 439/347 |
| 5,526,493 | 6/1996 | Shu | 395/281 |
| 5,535,093 | 7/1996 | Noguchi et al. | 361/686 |
| 5,579,528 | 11/1996 | Register | 395/309 |
| 5,592,362 | 1/1997 | Ohgami et al. | 361/686 |
| 5,598,539 | 1/1997 | Gephardt et al. | 395/281 |
| 5,648,762 | 7/1997 | Ichimura et al. | 340/825.31 |

FOREIGN PATENT DOCUMENTS 59-87526   5/1984   Japan .

*Primary Examiner*—Ayaz R. Sheikh
*Assistant Examiner*—Ario Etienne
*Attorney, Agent, or Firm*—Oblon, Spivak, McClelland, Maier & Neustadt, P.C.

[57] ABSTRACT

A computer main body has a system bus. The system bus is connected to a PCI-DS bridge. A docking station has a plurality of expansion devices for expanding the functions of the computer main body. The computer main body is attached to the docking station by means of the DS-PCI/ISA bridge of the docking station and the PCI-DS bridge of the computer main body, while the expansion devices of the docking station are separated from the bus of the computer main body. The computer main body outputs to the docking station an instruction for starting power supply, after having been attached. After switching on of the docking station has been detected, gates in the bus sides of the DS-PCI/ISA bridge and the PCI-DS bridge are switched ON.

23 Claims, 13 Drawing Sheets

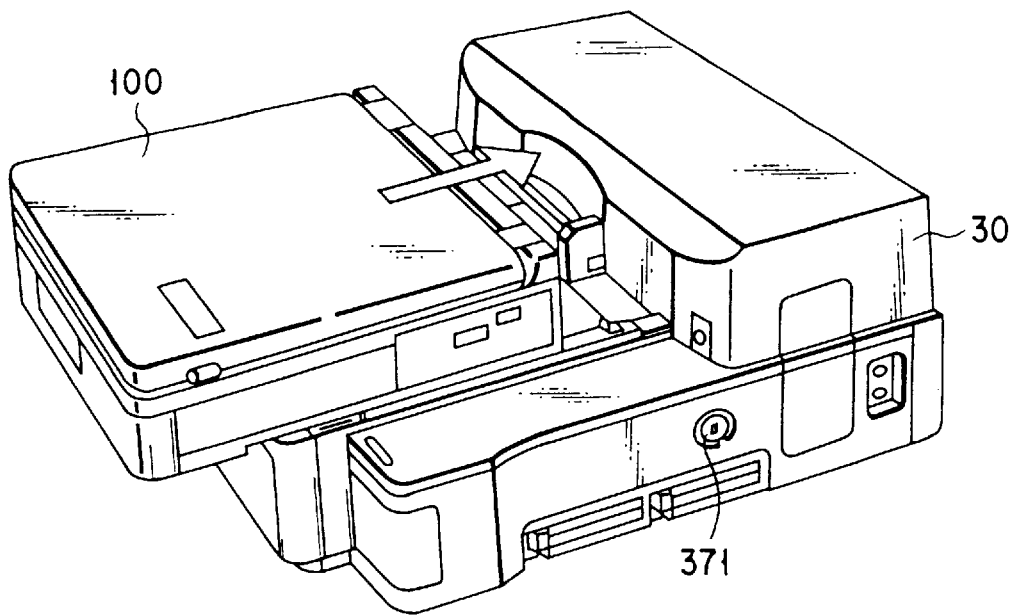
F I G. 5
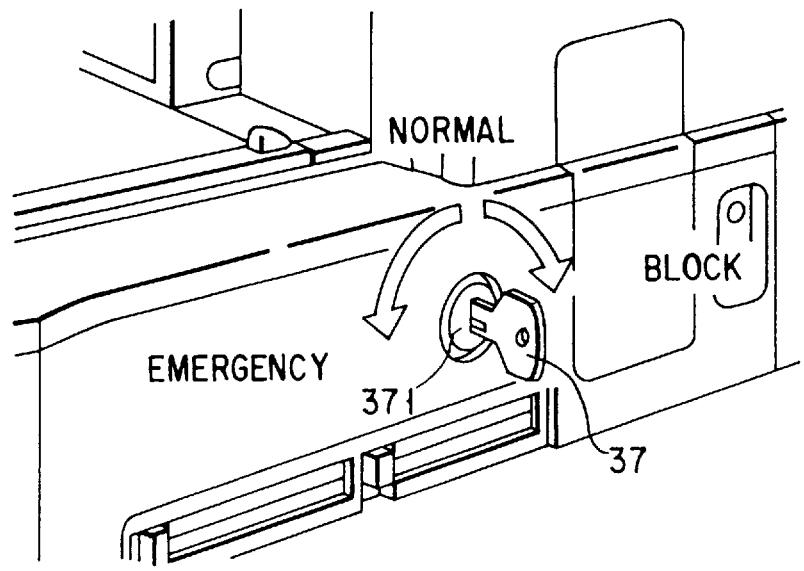
F I G. 6

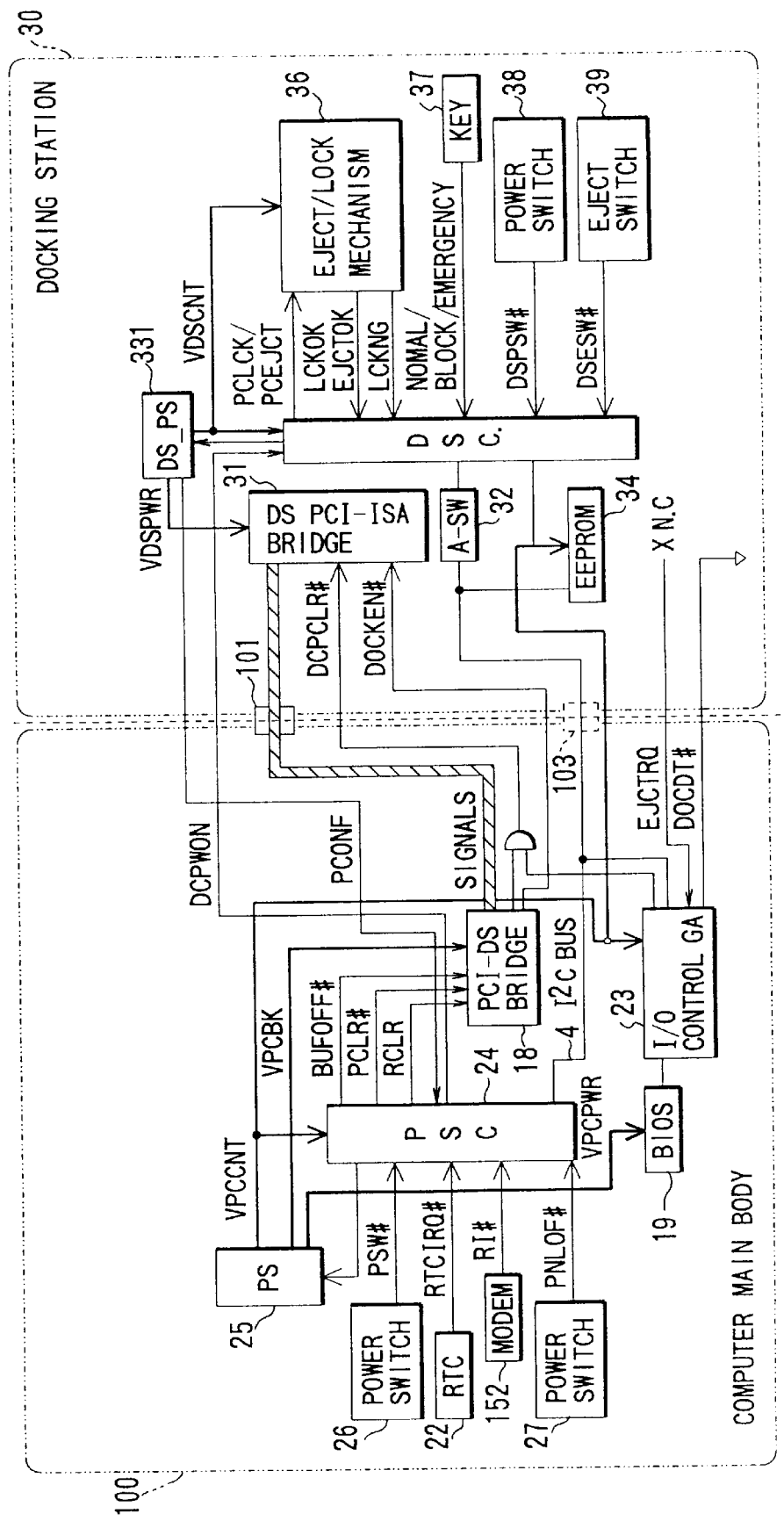
F I G. 9A

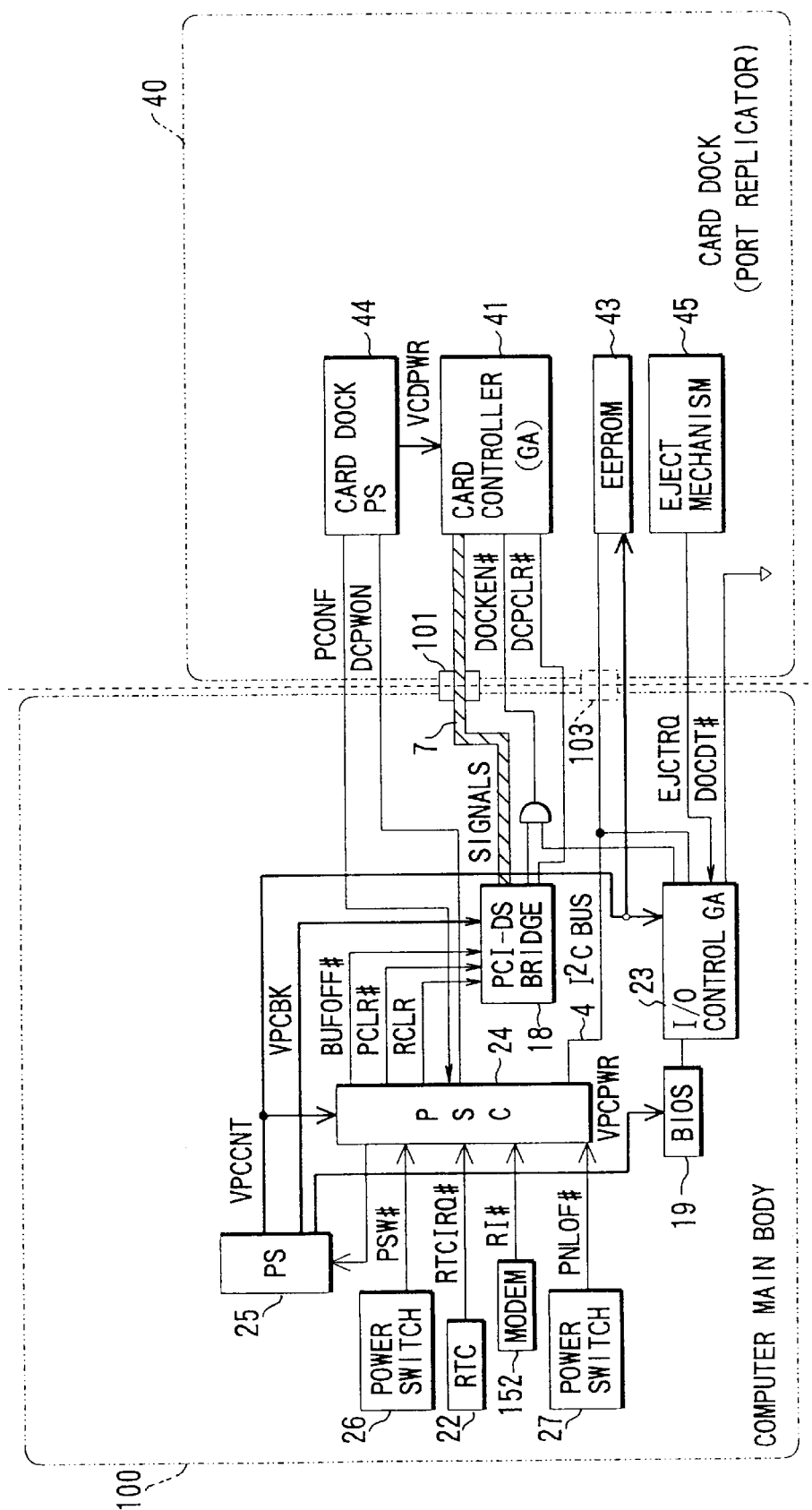
F I G. 9B

COMPUTER SYSTEM HAVING COMPUTER MAIN BODY AND EXPANSION UNIT

BACKGROUND OF THE INVENTION

1. Field of the Invention

The present invention relates to a computer system having a main body and an expansion unit attached to/detached from the main body. More particularly, it relates to a computer system in which an expansion unit can be attached and detached in the main body which power is being supplied to the main body.

The invention also relates to a computer system which has a main body and an expansion unit driven by using the battery provided in the main body and in which the main body and the expansion unit can be connected to a connector having a small number of pins.

2. Description of the Related Art

In recent years, various personal portable computers of a laptop type and a notebook type easily carried and operable by a battery have been developed. The portable computer of this type is constructed such that an expansion unit can be attached so as to expand its functions, as necessary.

The expansion unit has a drive bay housing driving devices such as a hard disk drive and the like, and expansion slots through which various optional cards are placed. Therefore, by using the portable computer connected to this expansion unit as necessary, it is possible to easily expand the functions of the portable computer without losing its portability.

Recently, moreover, expansion units as a simple type expansion unit, for example a port replicator incorporating a PC card controller, have been developed. Thus, depending on purposes, the same portable computer is used being selectively connected to a plurality of expansion units.

Conventionally, while the power of the computer main body is turned ON, attaching and detaching of the expansion unit have involved the risk of destroying the optional card of the expansion unit, because of unexpected flowing of a current from the computer main body to the optional card due to hot swapping. As a result, it is necessary for a user manually that the power of the expansion unit and the main body is turned off, prior to attaching and detaching the main body to and from the expansion unit. The conventional type thus has a lack of convenience.

Where the portable replicator incorporating PC card controller is used, conventionally three kinds of driving power sources, 3.3V, 5V and 12V have all been supplied from the main body to PCMCIA slots. As a result, the number of pins used as power lines increase and the size of the connector, for connecting the computer main body with the expansion unit, increase. Also, power is always output into the connector in the main body side. Thus, if no expansion units are placed, the pins of the connector may be short-circuited for some reason, allowing an excessive current to flow. This excessive current may damage devices within the main body.

In the main body and the expansion unit, a connector for connecting such peripheral equipment as a mouse, a keyboard, a joystick and the like therewith is provided. Power is supplied from the main body to the peripheral equipment by this connector. A fuse is normally connected to a line for supplying power for the purpose of protection from an excessive current.

In such a method using the fuse, however, when the fuse is blown and needs to be replaced, the main body must be sent to a service center, etc., for repair. This is usually for the reason that it is far more difficult for the user to repair the portable computer of the notebook type and the like, than a desktop type. In order to deal with this problem, use of excessive current protection parts of automatic recovery type, for instance a breaker, may be considered. Being large in size, however, it is difficult for these to be actually used in the portable computer.

As described above, the expansion unit is important in order to expand the functions of the portable computer. Conventionally, however, attaching and detaching of the computer main body to and from the expansion unit, while power for the computer main body is turned ON, has resulted in destruction of the optional card and the computer hanging-up. There has also been a problem of supplying of a number of power lines from the main body to the expansion unit. Furthermore, in the conventional type, the fuse has been used for the purpose of protection from an excessive current and the main body must be sent for repair when the fuse is to be replaced.

SUMMARY OF THE INVENTION

It is a first object of the invention to provide a computer system, wherein a computer main body can be attached/detached to and from an expansion unit while power is kept ON.

It is a second object of the invention to provide a computer system, wherein the form of supplying power, from the main body to the expansion unit and peripheral equipment by a connector, can be improved and the number of power lines drawn from the main body to the expansion unit can be reduced and protection from an excessive current can be efficiently provided.

According to a first aspect of the present invention, there is provided a computer system comprising: a computer main body; and an expansion unit attachable to the computer main body, the expansion unit including: at least one expansion device for expanding functions of the computer main body; a first connector; a first switching means provided between the at least one expansion device and the first connector; and power supply control means for controlling switching the expansion unit on and off in response to a command, and the computer main body including: a system bus; a second connector connectable to the first connector; second switching means provided between the system bus and the second connector; detecting means for detecting whether the first connector and the second connector are connected; instructing means for outputting a command for instructing the power supply control means to switch on the expansion unit when the detecting means detects that the first connector and the second connector are connected; and connection control means for connecting electrically the system bus to the at least one expansion device, by respectively switching on the first switching means and the second switching means, when the expansion unit is switched on in response the command from the instructing means.

According to a second aspect of the present invention, there is provided a computer system comprising: a computer main body; and an expansion unit attachable to the computer main body, the expansion unit including: at least one expansion device for expanding functions of the computer main body; a first connector; a first gate logic provided between the at least one the expansion device and the first connector; and a first power supply controller for controlling switching the expansion unit on and off in response to a command, and the computer main body including: a system bus; a second connector connectable to the first connector; a second gate logic provided between the system bus and the second connector; a second power supply controller for outputting a command for instructing the first power supply controller to switch on the expansion unit in response to a connection detected signal, and for detecting switching on of the expansion unit; and a control section for detecting connection between the first connector and the second connector and outputting the connection detected signal to the second power supply controller, and switching on gates of the first gate logic and the second gate logic when the second power supply controller detects the switching on of the expansion unit, thereby electrically connecting the system bus and the at least one expansion device together.

In the computer system of the invention, there are connected gate logics respectively between the expansion device of the expansion unit and the connector, and between the system bus of the main body and the connector. By means of these gate logics, with a bus connection disconnected between the main body and the expansion unit, the main body is placed to the expansion unit. After the main body has been placed, an instruction for switching power ON is given from the main body to the expansion unit, and when power switching-ON of the expansion unit is recognized, the gates of the gate logics are switched ON. Therefore, even while power for the main body is ON, any problems due to hot swapping will not occur, making it possible to perform hot docking.

In the computer system according to the first aspect, a computer system, wherein the connection control means switches OFF the first switching means and the second switching means in response to an ejecting request for instructing ejection of the main body from the expansion unit, and the instructing means outputs a command for instructing the expansion unit to switch OFF power, after the first and second switching means are switched OFF.

In the computer system according to the second aspect, a computer system, wherein the control section switches OFF the gates of the first gate logic and the second gate logic respectively in response to an ejection request for instructing injection of the main body from the expansion unit, and the second power source controller outputs a command for instructing the first power source controller to switch OFF power, after the gates of the first gate logic and the second gate logic are respectively switched OFF.

In this computer system, there are also connected gate logics respectively between the expansion device of the expansion unit and the connector, and between the system bus of the main body and the connector. When an ejecting request for ejecting the main body from the expansion unit is issued from the expansion unit or software, first a bus connection is disconnected between the main body and the expansion unit by means of the gate logics and then, power switching-OFF is instructed to the expansion unit. In this manner, an ejecting enable state is automatically set prior to actual ejection of the main body from the expansion unit. Therefore, even while power for the main body is kept ON, it is possible to perform hot undocking without bringing about any problems due to hot swapping.

According to a third aspect of the present invention, there is provided a computer system comprising: a computer main body; and an expansion unit attachable to and from the computer main body, the computer main body including: a first AC adapter connectable to an AC power supply; a battery; a first power line for applying a voltage from either the first AC adapter or the battery; a first DC/DC converter connected to the first power line, for generating a plurality of driving voltages for driving the computer main body, in accordance with the voltage supplied; and a first connector, and the expansion unit including: at least one expansion device for expanding functions of the computer main body; a second connector connectable to the first connector; and a second DC/DC converter connected to the first power line by the first and second connector, for generating a plurality of driving voltages for driving at the least one expansion device in accordance with the voltage applied from either the first AC adapter or the battery.

In this system, a DC/DC converter is provided within the expansion unit and a plurality of driving voltages are generated from one power line drawn out of the main body. Therefore, it is possible to reduce the number of power lines drawn from the main body to the expansion unit and minimize the connector size.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 5 is a view showing attaching the main body with its structure shown in FIG. 1 to the docking station shown in FIG. 4;

FIG. 6 is a view illustrating a locking mechanism provided in the docking station shown in FIG. 4;

FIGS. 9A and 9B are views respectively showing connection structures for docking/undocking control between the computer main body and the docking station and between the computer main body and the card dock, used in the computer system of the embodiment;

DETAILED DESCRIPTION OF THE PREFERRED EMBODIMENTS

The preferred embodiment of the invention will now be described with reference to the accompanying drawings.

Figure 1:
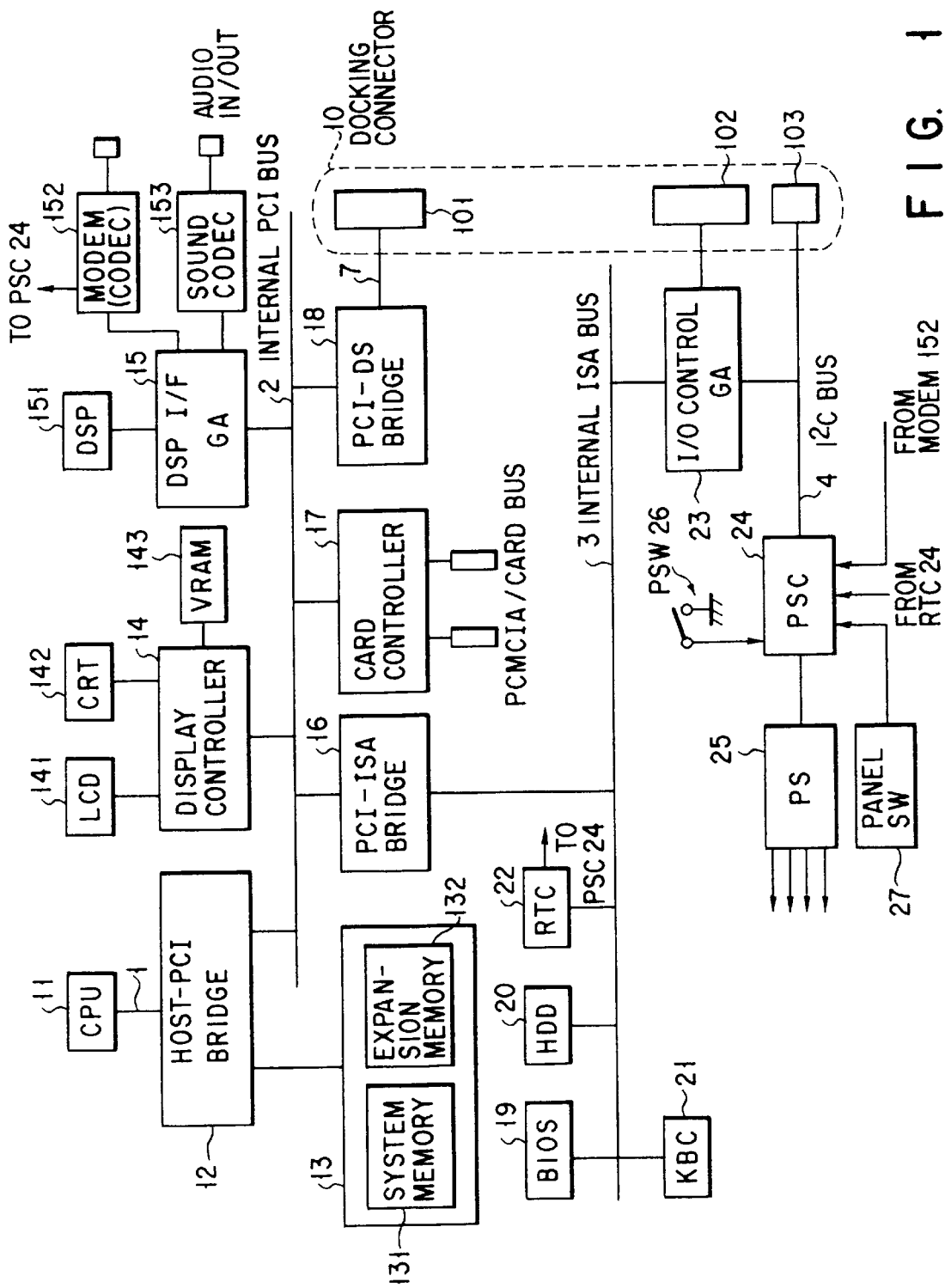
FIG. 1 is a block diagram showing the system structure of the main body of a computer system of an embodiment of the invention.
Figure 2:
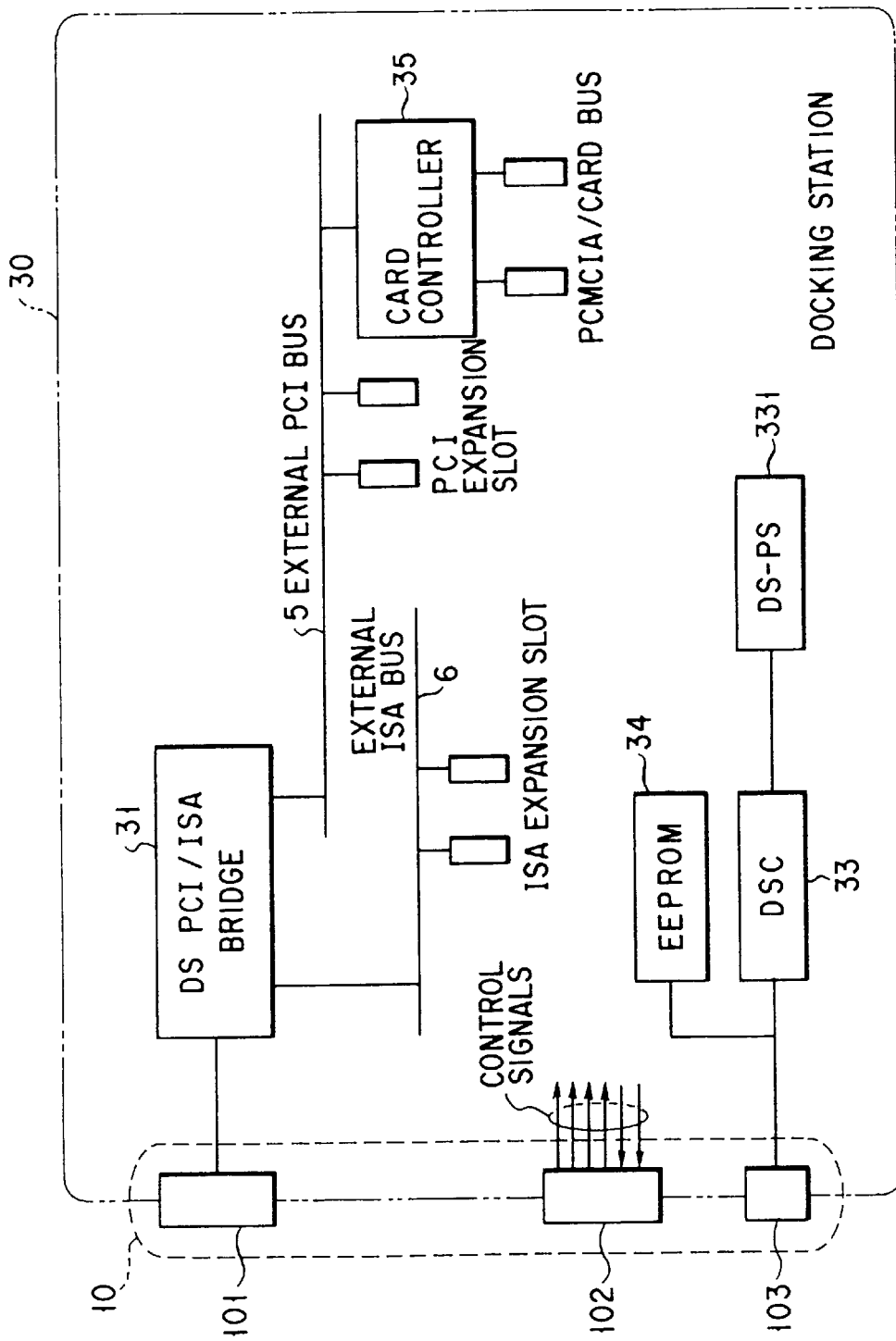
FIG. 2 is a block diagram showing the structure of a docking station used in the computer system of the embodiment.
Figure 3:
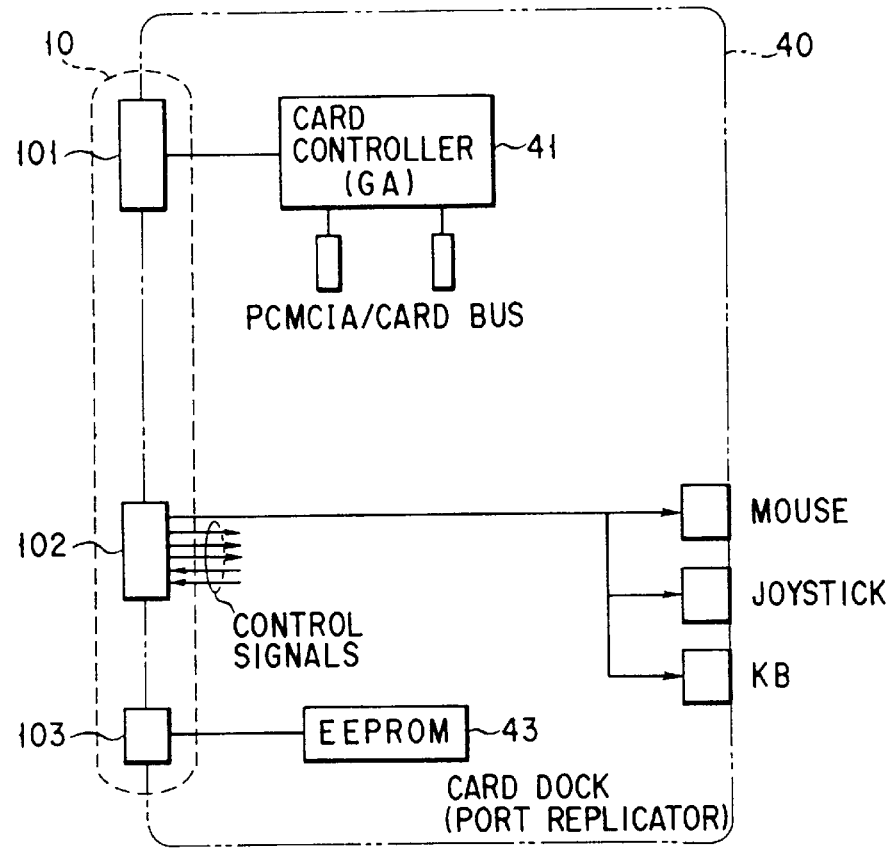
FIG. 3 is a block diagram showing the structure of a card dock used in the computer system of the embodiment.

FIG. 1 illustrates the structure of the main body of a computer system of an embodiment of the invention. This computer is a portable computer of a notebook or a laptop type driven by a battery. On the system board of this main body, a processor bus 1, an internal Peripheral Component Interconnect (PCI) bus 2, an internal Industry Standard Architecture (ISA) bus 3 and I$^2$C bus 4 are disposed. As an expansion unit for expanding functions, a docking station 30 shown in FIG. 2 or a card dock (port replicator) 40 shown in FIG. 3 is connected to a docking connector 10 provided in the portable computer main body by a user if necessary. The docking connector 10 is constructed, as shown in the drawing, by three connector elements (pin group) 101, 102 and 103.

In the main body, there are provided a Central Processing Unit (CPU) 11, a host/PCI bridge device 12, a memory 13, a display controller 14, a DSP (Digital Signal Processing) interface gate array (DSP IF GA) 15, an internal PCI-ISA bridge device 16, a card controller 17, a PCI-DS (DS: docking station) bridge device 18, a BIOS ROM (BIOS: Basic Input Output System, ROM: Read-Only Memory) 19, a Hard Disk Drive (HDD) 20, a keyboard controller 21, a real time clock (RTC) 22, an I/O control gate array 23 and a power source controller(PSC) 24.

The docking station 30 is utilized for adding such expansion devices as a PCI expansion card, an ISA expansion card, a PC card, a HDD, a Compact Disk-Read-Only Memory (CD-ROM) drive. In this docking station 30, as shown in FIG. 2, an external PCI bus 5 and an external ISA bus 6 are disposed as expansion buses. A drive bay, a PCI expansion slot and an ISA expansion slot are connected to these. A DS-PCI/ISA bridge device 31, a DS controller 33 and an EEPROM (Electrically Erasable and Programmable ROM) 34 are further provided in this docking station 30.

The card dock 40 is a port replicator having PC card slots. As shown in FIG. 3, an I/O port connector (mouse connector, keyboard connector and the like), a PC card controller 41 and an EEPROM 43 are provided therein.

Next, the function and structure of each component provided in the main body of FIG. 1 will be described.

For the CPU 11, for instance a microprocessor "Pentium" available from U.S. Intel Company may be used. The processor bus 1 directly connected to the I/O pin of this CPU 11 has a data bus of 64-bit width.

The memory 13 is for storing an operating system, a device driver, an application program to be executed and data to be processed. This memory 13 is constituted of a plurality of DRAM modules, and comprises a system memory 131 mounted beforehand on the system board and an expansion memory 132 attached by a user as occasion demands. For the DRAM module constituting these system memory 131 and expansion memory 132, a high-speed memory, for instance a synchronous Dynamic Random Access Memory (DRAM) or a Rambus, to which a memory clock must be supplied for each bank, is utilized.

This memory 13 is connected to the host/PCI bridge device 12 by an exclusive memory bus having a data bus of 32-bit or 64-bit width. As a data bus for the memory bus, the data bus of the processor bus 1 may be used. In this case, the memory bus comprises an address bus and various memory control signal lines.

The host/PCI bridge device 12 is a bridge LSI for interconnecting the processor bus 1 and the internal PCI bus 2 and functions as one of the bus masters for the PCI bus 2. This host/PCI bridge device 12 is provided with a function for transforming a bus cycle containing data and an address between the processor bus 1 and the internal PCI bus 2 in a bidirectional manner and a function for access-controlling the memory 13 by the memory bus.

The internal PCI bus 2 is an I/O bus of a clock synchronous type and cycles thereon are all performed in synchronization with a PCI bus clock. The frequency of the PCI bus clock is up to 33 MHz. The PCI bus 2 is provided with an address/data bus used in a time-division manner. This address/data bus has a 32-bit width.

A data transfer cycle on the PCI bus 2 is constituted of an address phase and subsequent at least one of data phases. In the address phase, an address and a transfer type are output and in the data phases, data of 8, 16, 24, or 32 bits are output.

The display controller 14 is, similar to the host/PCI bridge device 12, one of the bus masters for the PCI bus 2 and displays the image data of a video memory (VRAM) 143 on a Liquid Crystal display (LCD) or an external Cathode-Ray Tube (CRT) display 142.

The DSP interface gate array 15 is one of the PCI devices and constitutes a DSP system for processing various sounds and telephone/data communications in cooperation with a DSP 151, a MODEM (CODEC) 152 and a sound CODEC 153.

This DS interface gate array 15 communicates with the DSP151, MODEM(CODEC)152 and the sound CODEC 153 and controls sound processing and communication processing utilizing the digital signal processing function of the DSP 151 under control of an exclusive device driver program read into the memory 13 and executed.

The internal PCI-ISA bridge device 16 is a bridge LSI for interconnecting the internal PCI bus 2 and the internal ISA bus 3 and functions as one of the PCI devices. In this internal PCI-ISA bridge device 16, a PCI bus arbiter and a DMA controller are incorporated. The BIOS ROM 19, the HDD 20, the keyboard controller 21, the RTC 22 and the I/O control gate array 23 are connected to the internal ISA bus 3.

The card controller 17 is one of the PCI devices and controls a PC card of PCMCIA or card bus specifications.

The PCI-DS bridge device 18 controls a bus connection or disconnection between the docking station 30 and the card dock 40. More particularly, the PCI-DS bridge device 18 is a bridge LSI for linking the internal PCI bus 2 with the docking bus 7 equivalent to a PCI bus and functions as one of the PCI devices. This docking bus 7 is drawn to the outside by the connector element 101 of the docking connector 10 and connected to the docking station 30 and the card dock 40.

The I/O control gate array 23 is a bridge LSI for linking the internal ISA bus 3 with the I²C bus 4 and incorporates a plurality of register groups, through which data can be read from and written in by means of the CPU 11. By utilizing these register groups, communications can be performed between the CPU 11 and the power source controller 24 on the I²C bus 4.

From this I/O control gate array 23, a plurality of control signal lines connected to the docking station 30 and the card dock 40 are drawn to the outside by the connector element 102 of the docking connector 10. The I/O control gate array 23 detects docking/undocking between the main body and the docking station 30 or the card dock 40. This also performs control so as to prevent destruction of the expansion devices and malfunction of the system in the docking station 30 or the card dock 40 due to hot swapping when the main body is connected to the docking station 30 or the card dock 40 with its power kept ON.

The I²C bus 4 is a bidirectional bus, being constituted of one clock signal line and one data line (SDA). This is drawn to the outside by the connector element 103 of the docking connector 10.

The power source controller 24 controls supplying of power from a power supply 25 to each component. Especially, the power source controller 24 performs processing in accordance with switching ON/OFF of a power source switch (PSW) 26, switching ON/OFF of a panel switch 27 operated based on opening/closing of a panel, a signal sent from the MODEM 152 and a signal sent from the RTC 22. The power source controller 24 performs power supply control for docking/undocking between the docking station 30 and the card dock 40.

The power supply 25 can be connected to an AC power supply by an AC adapter(not shown). The AC adapter converts an AC current supplied from the AC power supply into a DC current of a predetermined value and provides this to the power supply 25. The power supply 25 is connected to an incorporated battery, not shown. The power supply 25 generates an operation voltage (±5V or ±12V) necessary for driving the main body from a voltage supplied by the AC adapter, a voltage supplied from the incorporated battery or a voltage supplied from the docking station 30 or the card dock 40.

Next, the components of the docking station 30 of the FIG. 2 will be described.

Figure 4:
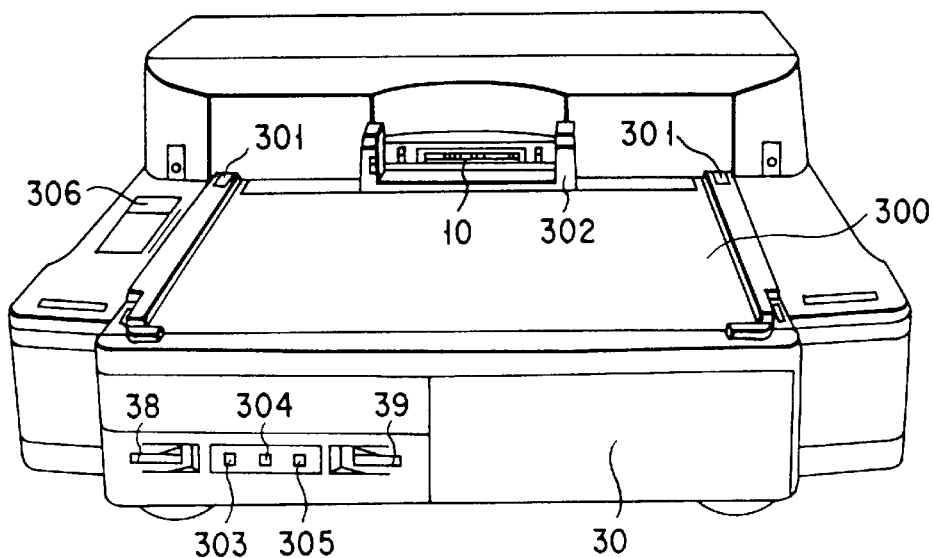
FIG. 4 is a view showing the appearance of the docking station with its structure shown in FIG. 2.

As noted above, the docking station 30 is an expansion unit to which the portable main body is placed so as to be detached. FIG. 4 illustrates the appearance of the docking station 30 of the embodiment of the invention. FIG. 5 illustrates attaching the main body to the docking station 30.

Referring to FIG. 4, the casing of this docking station 30 has a mounting surface 300 for housing the portable computer main body. This mounting surface 300 is nearly the same in size as the bottom surface of the portable computer main body and guide sections are created in both left and right ends thereof for introducing the portable computer main body to an attaching position. In the rear ends of the guide sections, guide pins 301 are provided, being protruded from the guide sections and inserted into holes provided in the bottom surface of the portable computer main body for fixing the same in a position so as to secure its connection with the docking station 30 when the portable computer main body is set to the attaching position and the docking connectors 10 are connected to each other. These guide pins 301 are pressed downward so as to be removed from the holes formed in the bottom surface of the portable computer main body when an ejecting switch 39 is pressed.

The docking connector 10 is provided in the rear end of this mounting surface 300 and this docking station 10 is connected to the docking connector 10 provided in the rear surface of the portable computer main body set to the attaching position. In the casing of the docking station 30, an extruding section 302 is further provided so as to be freely slidable, being joined to the back face of the portable computer main body for pushing the portable computer main body forward along the mounting surface 300. Thus, the docking connectors 10 between the portable computer main body and the docking station 30 are separated from each other and the portable computer main body is ejected from the docking station 30.

The extruding section 302 is driven by a motor. But when the locking mechanism, later described, is in a predetermined location, this can be made manually slidable linked with the operation of a manual operation lever 306 by a user.

In the docking station 30, as shown in FIG. 4, there are provided a power supply switch 38, a power indicator 303, a drive-in use indicator 304, a docking indicator 305 and an ejecting switch 39. The power indicator 303 is lit to indicate that the docking station 30 is in a power ON state. The drive-in use indicator 304 continues to be lit during accessing of, for instance the expansion HDD within the docking station 30 in order to indicate its accessing. The docking indicator 305 starts flickering when the portable computer main body is set to the attaching position and continues to be lit after the above-noted guide pins 301 have been correctly inserted into the holes formed in the bottom surface of the portable computer main body and fixing of the portable computer main body has been completed. In this manner, if the portable computer main body and the docking station 30 are not correctly connected to each other, an alarm will be generated, repeatedly flickering the docking station 30.

The ejecting switch 39 is an operation switch for removing the main body docked with the docking station 30 therefrom. When this ejecting switch 39 is pressed, the above-noted guide pins 301 are removed from the holes created in the bottom surface of the portable computer main body. Then, the portable computer main body is ejected from the docking station 30 by the extruding section 302.

Referring to FIG. 6, in the left side of the docking station 30, there is provided a locking mechanism for realizing a security function regarding attaching/detaching of the portable computer to the docking station 30. This locking mechanism comprises a key cylinder with a key hole 371 and a key 37 inserted into the key hole 371 so as to be freely removed for rotating the key cylinder. The locking mechanism has three positions, normal (NORMAL), block (BLOCK) and emergency (EMERGENCY) positions, respectively corresponding to the rotational positions of the cylinder.

The normal (NORMAL) position is for permitting attaching/detaching of the portable computer to and from the docking station 30. When the key position of the key 37 is in the normal (NORMAL) position, if the portable computer is attached to its attaching position on the docking station 30, the portable computer is locked on the docking station 30 by the guide pins 301. When the ejecting switch 39 is pressed, the guide pins 301 are lowered. Then, the portable computer is ejected from the docking station 30 by the extruding section 302.

The block (BLOCK) position is for prohibiting new attaching and detaching of the portable computer to and from the docking station 30. When the key position of the key 37 is in the block (BLOCK) position, if the portable computer is attached to its attaching position to the docking station 30, the extruding section 302 is driven and the portable computer is ejected from the docking station 30. The pressing operation of the ejecting switch 39 is made invalid and the portable computer locked on the docking station 30 remains in a locked state. Further, when power for the docking station 30 is switched ON with the portable computer is already locked thereon, or when the locking mechanism is set to the block (BLOCK) position, this state is maintained without any operations performed. Unless the portable computer is in the locked state, an ejecting operation is performed.

The emergency (EMERGENCY) position is for permitting manual ejection of the portable computer without using the above-noted motor-driven locking/ejecting mechanism at all. Only when the key position of the key 37 is in the emergency (EMERGENCY) position, manual ejection of the portable computer utilizing the manual type operation lever 306 is possible. More particularly, a linking mechanism for mechanically linking together the manual operation lever 306 and the extruding section 302 is in a separated state because of the relative arrangements of the key cylinder position and the linking mechanism at the time other than the emergency (EMERGENCY) position. Thus, only in the emergency (EMERGENCY) position, the manual operation lever 306 and the extruding section 302 are mechanically linked with each other.

The DS-PCI/ISA bridge device 31 provided in the docking station 30 having the above-described structure is a bridge LSI for interconnecting the docking bus 7 drawn out of the main body to the docking station 30, the external PCI bus 5 and the external ISA bus 6. This DS-PCI/ISA bridge device 31 is one of the PCI devices.

The DS controller 33 is a microcomputer for controlling switching ON/OFF of power for the docking station 30 and docking/undocking between the portable computer main body and the docking station 30. This communicates with the power source controller 24 and the I/O control gate array 23 of the main body by using the I2 C bus 4.

The EEPROM 34 is for storing PnP information necessary for plug and play, such as the attribute (address, DMA channel, IRQ number and others) of the expansion card fitted into the expansion slot of the docking station 30. This PnP information is read from the EEPROM 34 by means of the control gate array 23 via the I²C bus 4 under control of the system BIOS of the BIOS ROM 19 when the main body is docked with the docking station 30 or when power is switched ON for the main body or the docking station 30.

The card controller 35 controls the PC card based on the PCMCIA/card bus as in the case of the card controller 17 within the main body.

A power supply circuit (DS PS) 331 for supplying an operation voltage to each component of the docking station 30 is connected to the DS controller 33. This power supply circuit 331 produces various operation voltages (±5V, ±12V, etc.) based on voltages supplied from the AC adapter (not shown) connected to the AC power source.

Next, the card dock 41 will be described.

The card dock 40 shown in FIG. 3 is also an expansion unit attached in the portable computer main body so as to be removable.

The card controller 41 provided in this card dock 40 is for controlling the PC card based on the PCMCIA/card bus.

The EEPROM 43 stores PnP information necessary for plug and play, for instance the attribute of the PC card fitted into the PC card slot of the card dock 40. This PnP information is read from the EEPROM 43 by means of the control gate array 23 via the I²C bus 4 under control of the system BIOS of the BIOS ROM 19 when the main body is docked with the card dock 40 or when power is switched ON for the main body or the card dock 40.

This card dock 40 is provided with an AC adapter not shown in FIG. 3. The power supply of this AC adapter will be described later.

Next, the casing structure of the card dock 40 will be described by referring to FIGS. 7 and 8.

Figure 7:
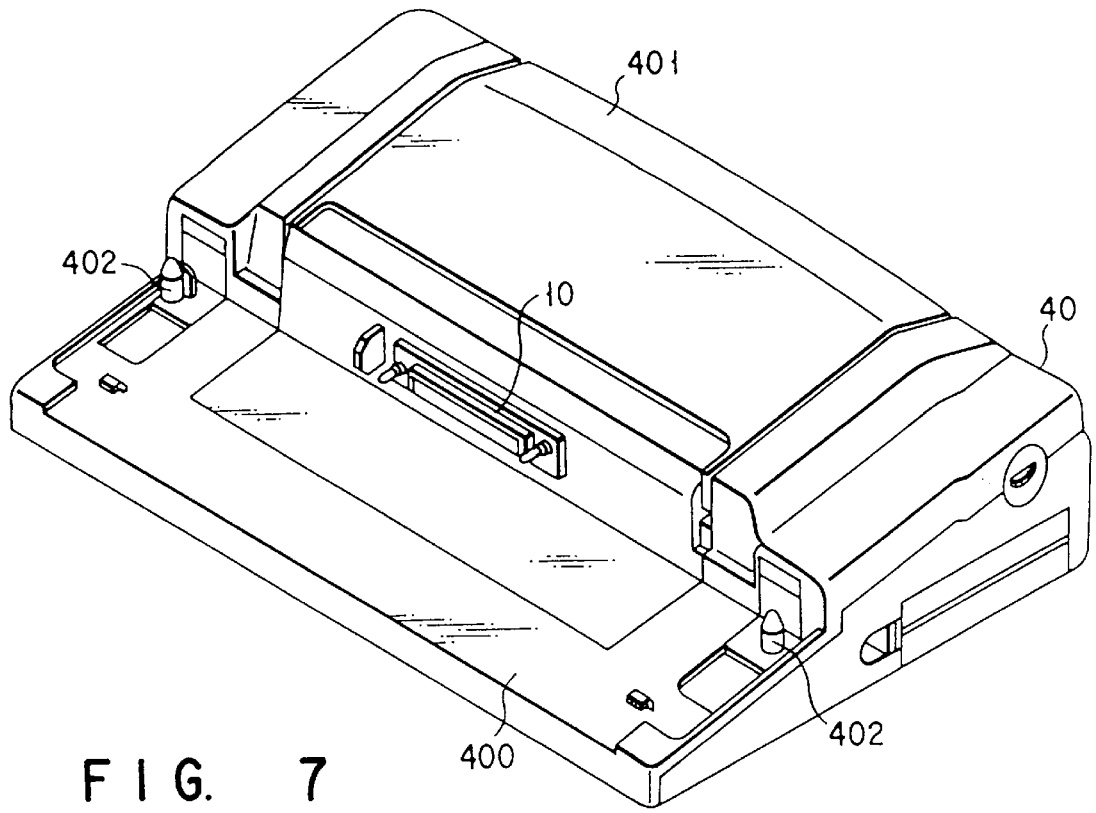
FIG. 7 is a front view showing the appearance of the card dock with its structure shown in FIG. 3.

As illustrated in FIG. 7, the casing of the card dock 40 is provided with a mounting surface 400 for housing the portable computer main body. This mounting surface 400 is almost the same in size as the bottom surface of the portable computer main body. In the rear end portions of both left and right ends of the mounting surface 400, there are provided guide pins 402 for guiding the portable computer main body to its attaching position in such a manner that the pins are inserted into holes formed in the bottom surface of the portable computer main body and the connectors 10 of the portable computer main body and the card dock 40 are connected to each other. These guide pins 402 move back and forth on the mounting surface 400 interlockingly with the operation of a manual handle 401. These are placed in front portions on the mounting surface 400 when the manual handle 401 is raised by a user. They are placed in back portions on the mounting surface 400 when the manual handle 401 is pushed down as shown in the drawing. When the portable computer main body is to be attached to the card dock 40, first the manual handle 401 is raised and the guide pins 402 are fitted into the holes created in the bottom surface of the portable computer main body in this state. Then, by means of pressing-down of the manual handle 401, the guide pins 402 lead the portable computer main body to the attaching position on the card dock 40 and the connectors 10 are connected to each other. When the portable computer main body is to be removed from the card dock 40, the manual handle 401 is raised, the portable computer is then pushed forward by the guide pins 402 and the connectors 10 are disconnected from each other.

Figure 8:
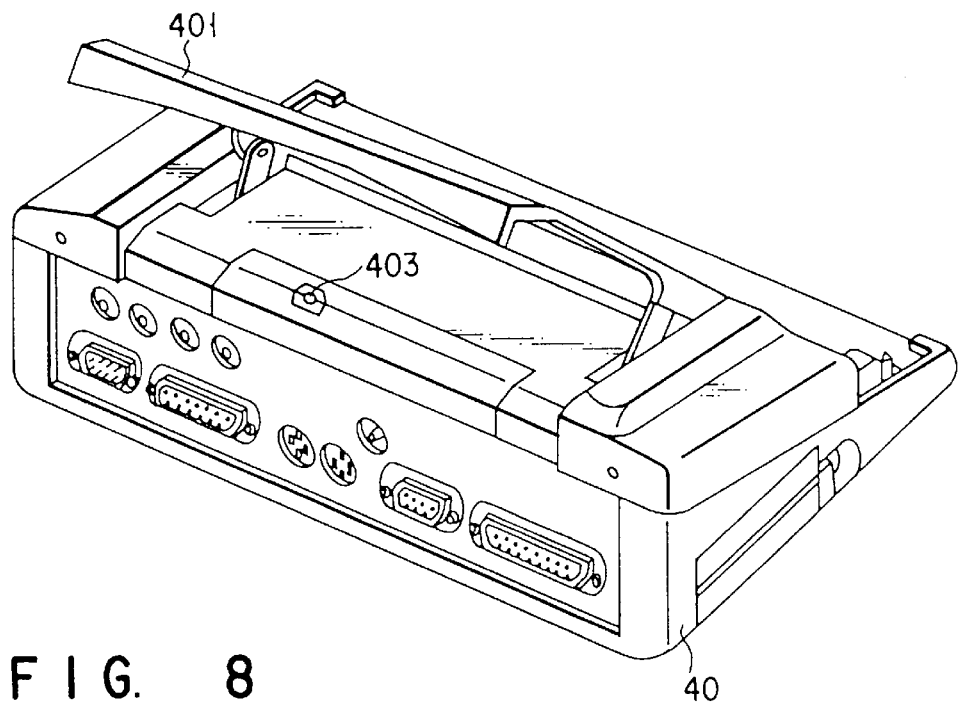
FIG. 8 is a rear view showing the appearance of the card dock shown in FIGS. 3 and 7.

FIG. 8 illustrates the appearance of the card dock 40 when seen from its back face. In the drawing, the manual handle 401 is shown to be in its raised state. A detection switch 403 provided in the casing of the card dock 40 is utilized for detecting opening/closing of the manual handle 401.

FIG. 9A illustrates, among the system structure units shown in FIGS. 1 and 2, the structure unit for docking/undocking between the main body 100 and the docking station 30. FIG. 9B illustrates the structure unit for docking/undocking between the main body 100 and the card dock 40, being extracted from those shown in FIGS. 1 and 3. In the drawing, a thick line indicates a power line.

Signal groups used for docking/undocking will be described hereinbelow.

<System—Power Supply>

VPCCNT: VPCCNT is a power supply of a control system constantly output from the power supply circuit (PS) 25 of the main body 100. This VPCCNT is supplied to the I/O control gate array 23 and the power source controller 24 for forming communication with the docking station 30 and the card dock 40 in order to control attaching/detaching of the main body 100.

VPCBK: VPCBK is a backup power supply output from the power supply circuit (PS) 25 and supplied to the PCI-DS bridge device 18 during power ON and suspended. VPCBK is also supplied to the memory 13, etc., of FIG. 1 in order to prevent erasing of information necessary for resumption.

VPCPWR: VPCPWR is a driving power supply output from the power supply circuit (PS) 25 and output only during power ON. VPCPWR is supplied to the BIOS ROM 19.

<Power Source Controller (PSC)>

PSW#: (Input) PSW# is a power supply switch signal from the power supply switch 26 and becomes Low when the power supply switch 26 is pressed.

PTCIRQ#: (Input) RTCIRQ# is an interruption signal from the RTC 22 and becomes Low when active.

RI#: (Input) RI# is a ring signal from the modem 152 and becomes Low when active.

PNLOF#: (Input) PNLOF# is a panel switch signal from the panel switch 27 and becomes Low when the display panel of the main body is opened.

BUFOFF#: (Output) BUFOFF# is a signal for switching OFF the gate of the gate array connected to the bus driven by a driving power supply and used, for instance when suspension is indicated to the PCI-DS bridge device 18. This becomes Low when active.

PCLR#: (Output) PCLR# is a reset signal output during power ON and OFF and becomes Low when active.

RCLR: (Output) RCLR is a reset signal output during resuming and power ON and becomes High when active.

DCPWON: (Output) DCPWON is a signal for instructing to switch ON the power supply circuit 44 in the card dock 40 and power for the docking station 30 and becomes High when active.

<I/O Control Gate Array>

DOCDT#: (Input) DOCDT# is a voltage value for a specified pin of the connector 10 and becomes Low when the main body is connected to the docking station 30 or the card dock 40.

<BIOS>

The system BIOS stored in the BIOS ROM 19 controls the power source controller 24 and the docking station 30 and transfers data therewith via the I/O control gate array 23.

DCPCLR#: (Output) DCPCLR# is a reset signal for the gate array in the docking station 30 or the card dock 40 and becomes Low when active.

DOCKEN#: (Output) DOCKEN# is a signal for permitting bus connection with the docking station 30 or the card dock 40 and used when bus connection is to be notified to the DS-PCI/ISA bridge device 31 in the docking station 30 and the card controller 41 in the card dock 40. This becomes Low when active.

<Docking Station>

DSPSW#: (Input) DSPSW# is a signal for indicating pressing-down of the power supply switch 38 in the docking station 30 and becomes Low when active.

DSESW#: (Input) DSESW# is a signal for indicating pressing-down of the ejecting switch 39 in the docking station 30 and becomes Low when active.

PCLCK: (Output) PCLCK is a signal for operating the mechanism for locking the main body and sent to the above-noted ejecting/locking mechanism 36 for performing a locking/ejecting operation by means of motor driving.

PCEJCT: (Output) PCEJCT is a signal for operating the mechanism for ejecting the main body and sent to the ejecting/locking mechanism 36.

LCKOK: (Input) LCKOK is a signal for indicating completion of locking the main body.

LCKNG: (Input) LCKNG is a signal for indicating catching of the lock during locking of the main body.

EJCTOK: (Input) EJCTOK is a signal for indicating completion of ejecting the main body.

NORMAL/BLOCK/EMERGENCY: (Input) These are signals for indicating the positions of the key 37. NORMAL indicates placing of the key 37 in a normal operation position. BLOCK position indicates placing of the key 37 in a position preventing mechanical ejection of the main body when docked and in a position preventing docking thereof when undocked. EMERGENCY indicates placing of the key 37 in a position permitting manual ejection of the main body.

VDSCNT: VDSCNT is a control system power supply and always supplied from the power supply circuit (DS PS) 331 when there is an AC input.

VDSPWR: VDSPWR is a driving power supply and supplied to the PCI slot, the bay and others from the power supply circuit (DS PS) circuit 331 during power ON.

PCONF: (Output) PCONF is a signal becoming active when VDSPWR is normal and becomes High when active. The power supply circuit (DS PS) 331 is normally operable only after the AC adapter has been connected.

Power supplies for the docking station controller 33 and the device connected to the I$^2$C bus 4 in the main body are different from each other. Thus, the controller 33 must be connected to the I$^2$C bus 4 by an analog switch 32.

<CDOC>

EJCTRQ: (Output) EJCTRQ is a signal for indicating that the handle 401 has moved to a certain position and the main body is about to be ejected and becomes High when active. EJCTRQ is output from the detection switch 403 shown in FIG. 8.

PCONF: (Output) PCONF is a signal for indicating that power supplied to the PC card is ON.

VCDPWR: VCDPWR is a driving power supply output from the power supply circuit 44 and supplied to the PC card slot. The power supply circuit 44 of the card dock 40 can operate by means of power provided from the main body even while the AC adapter is in a disconnected state.

Figure 10:
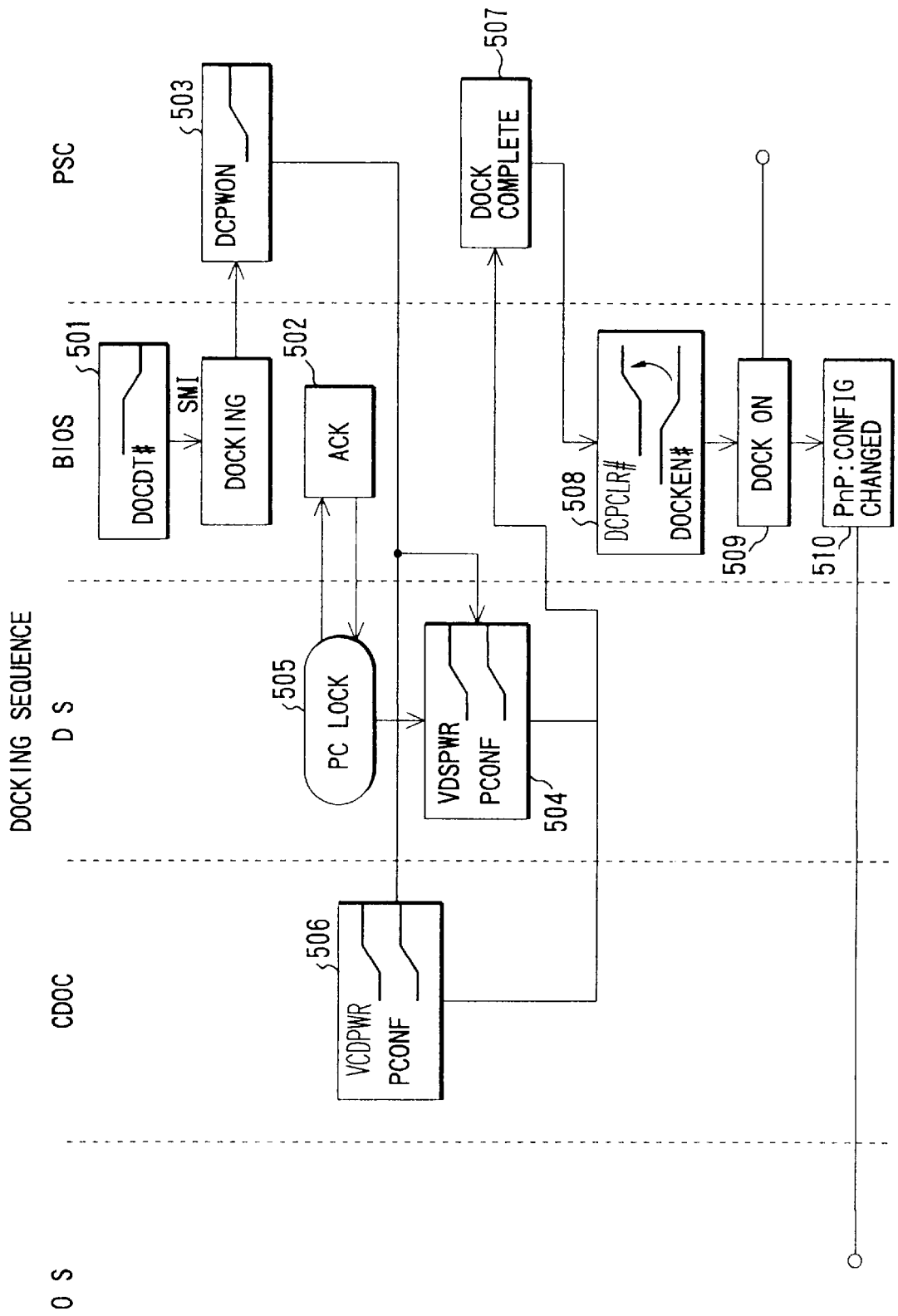
FIG. 10 is a view showing a docking sequence when the a main body is attached to the docking station and card dock in the computer system of the embodiment.

Next, the docking sequence when the main body is to be attached in the docking station 30/card dock 40 will be described by referring to FIG. 10.

Upon connection of the docking connectors 10 of the main body and the docking station 30 or the card dock 40 to each other, DOCDT# becomes active (501). This enables the I/O control gate array 23 to detect connection with the docking station 30 or the card dock 40 and the result thereof is notified to the CPU 11 by means of SMI (system management interruption). If power is OFF at this time, after power is switched ON by the power source controller 24, detection of the connection is notified to the CPU 11. The CPU 11 then starts the operation of the BIOS. The BIOS issues a command (Docking) indicating physical connection between the docking connectors 10 of the main body and the docking station 30 or the card dock 40 to the power source controller (PSC) 24 (502).

The power source controller (PSC) 24 turns DCPWON active and instructs the docking station 30 or the card dock 40 to switch power ON (503).

After the main body has been connected to the docking station 30, VDSPWR starts to be supplied in response to its DCPWON. If its power supplying is correctly performed, it causes PCONF to be active (504). In the docking station 30, since VPCCNT is supplied from the main body upon connection of the same, the DSC 33 starts docking control processing (PC-LOCK) at this time. If the key 31 is in a normal position (NORMAL), the main body is locked on the docking station 30 by the locking/ejecting mechanism 36 (505).

After the main body has been connected to the card dock 40, supplying of VCDPWR is started in response to its DCPWON. IF power supplying is correctly performed, PCONF is caused to be active (506). By this time, the main body has already been locked on the card dock 40.

Thereafter, upon confirming correct switching ON of the internal power supply in the docking station 30 or the card dock 40 by means of PCONF, the power source controller (PSC) 24 notifies equivalence of power levels between the docking station 30 or the card dock 40 and the main body to the BIOS through a command (Dock Completed) (507).

The BIOS causes the PCI-DS bridge 18 to switch ON the gate with the docking bus 7, interconnects the PCI bus 2 and the docking bus 7, causes DOCKEN# and DCPCLR# to be active and interconnects the DS-PCI/ISA bridge 31 and the docking bus 7 or the card controller 41 and the docking bus 7 (508).

Thereafter, the BIOS notifies completion of bus connection between the main body and the docking station 30 or the card dock 40 by means of DOCKEN# to the power source controller (PSC) 24 through a command (Dock ON) and performs environment setting for activating the docking station 30 or the card dock 40 in cooperation with the OS (509 and 510).

In the present system, as described above, attaching of the main body to the docking station 30 or the card dock 40 is executed with bus connection therebetween disconnected. After attaching of the main body, an instruction is given from the main body to the docking station 30 or the card dock 40 to switch its power ON. Then, upon confirmation of power ON for the docking station 30 or the card dock 40, the gate in the bus 7 side in the PCI-DS bridge 18 and the gate in the bus 7 side of the DS-PCI/ISA bridge 31 or the card controller 41 are switched ON. As a result, even when power for the main body is ON, hot docking can be performed without bringing about any problems due to hot swapping.

Figure 11:
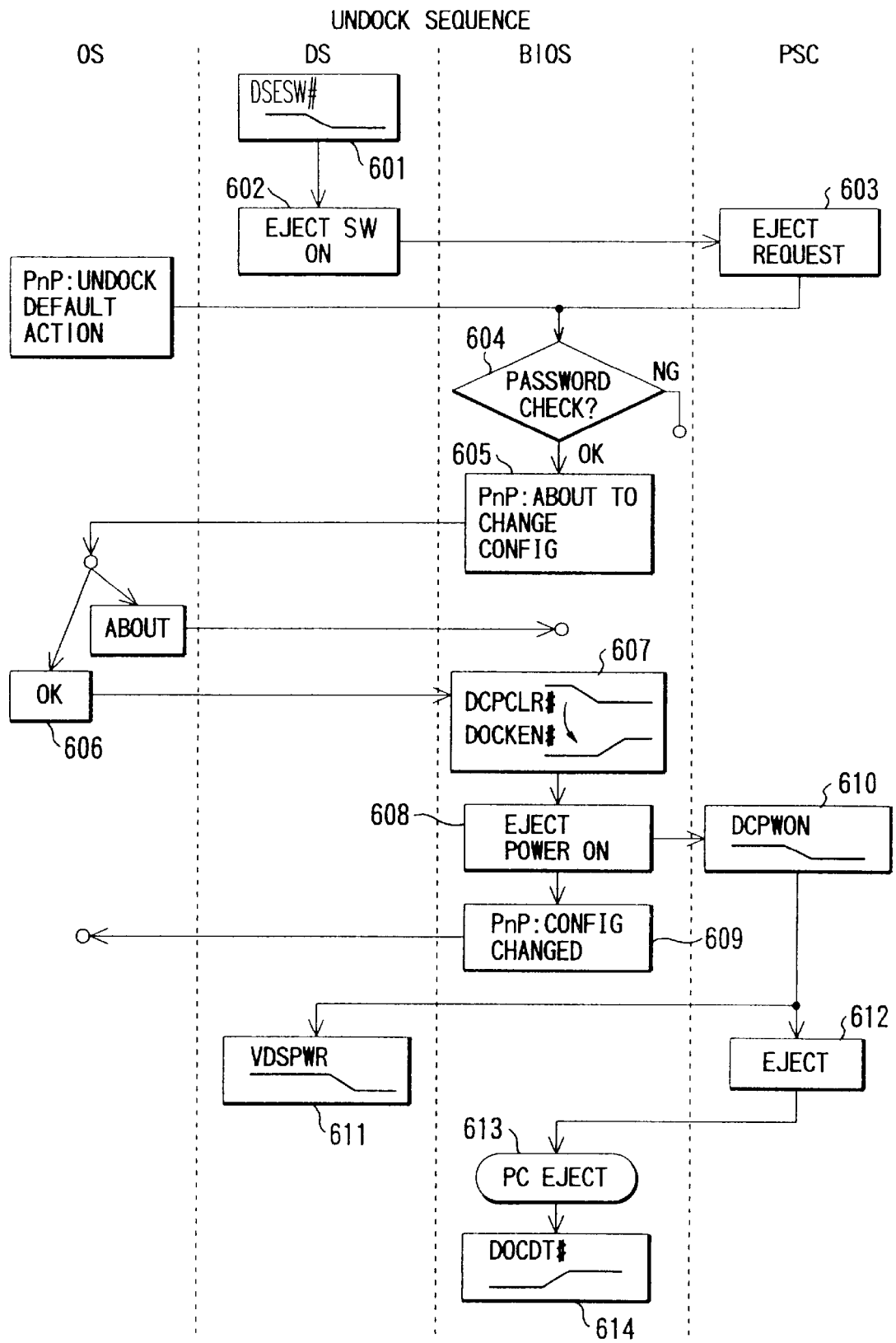
FIG. 11 is a view showing an undocking sequence when the main body is detached from the docking station in the computer system of the embodiment.

Next, the undocking sequence when the main body is to be removed from the docking station 30 will be described by referring to FIG. 11.

Pressing of the ejecting switch 39, causes DSESW# to be active and the DSC 33 detects the pressing of the ejecting switch 39 (601).

The DSC 33 then investigates whether the current position of the key 31 is in the block position (BLOCK) or not. If this is in the block position (BLOCK), the DSC 33 does not react to the pressing operation of the ejecting switch 39. However, if the current position of the key 31 is not in the block position (BLOCK), the DSC 33 notifies the power source controller 24 of the pressing of the ejecting switch 39 through a command (Eject SW ON) (602).

The power source controller 24 then notifies the BIOS of the issuance of an ejecting request through a command (Eject Request) (603).

The BIOS performs password checking if an ejecting password has been set (604). Then, the BIOS asks the OS if a change in setting of the system environment will be possible. If possible, the PCI-DS bridge 18 is caused to switch OFF the gate with the docking bus 7 and a connection between the PCI bus and the docking bus 7 is disconnected (605 and 606). At the same time, the BIOS turns DCPCLR# and DOCKEN# active and inactive respectively and the gate between the DS-PCI/ISA bridge 31 and the docking bus 7 is also switched OFF (607). Then, the BIOS issues a command (Eject power ON) instructing ejection of the main body to the power source controller 24 and changes the setting of the system environment in cooperation with the OS (608 and 609).

The power source controller 24 turns DCPWON to an inactive state and thereby VDSPWR for the disk station 30 is cut (610 and 611). Then, the power source controller 24 makes a request for ejection to the BIOS (612) and the ejecting request is sent from the BIOS to the DSC 33. Based on an instruction from the DSC 33, the ejecting operation of the ejecting/locking mechanism 36 is started and the main body is ejected from the docking station (613). DOCDT# is then turned inactive (614).

As described above, also in hot undocking, an eject enable condition is automatically set prior to actual ejection of the main body from the docking station 30. As a result, even when the main body is in a power ON state, hot undocking can be correctly carried out without bringing about any problems due to hot swapping.

Next, the undocking sequence when the main body is to be removed from the card dock 40 will be described by referring to FIGS. 12 and 13.

In the case of the card dock 40, since ejection is carried out by means of the operation of the handle 401, there is a possibility that ejection will occur immediately after starting of the ejecting operation is detected by the detection switch 403 (raising of the handle 401). Therefore, it is desired, by preparing beforehand an ejecting button on the OS for notifying the BIOS of an ejecting request in a software manner, for a user to issue the ejecting request by selecting the button on a screen. Such starting of the undocking sequence by means of the ejecting button on the OS can also be applied to the case of the docking station 30 shown in FIG. 1.

Figure 12:
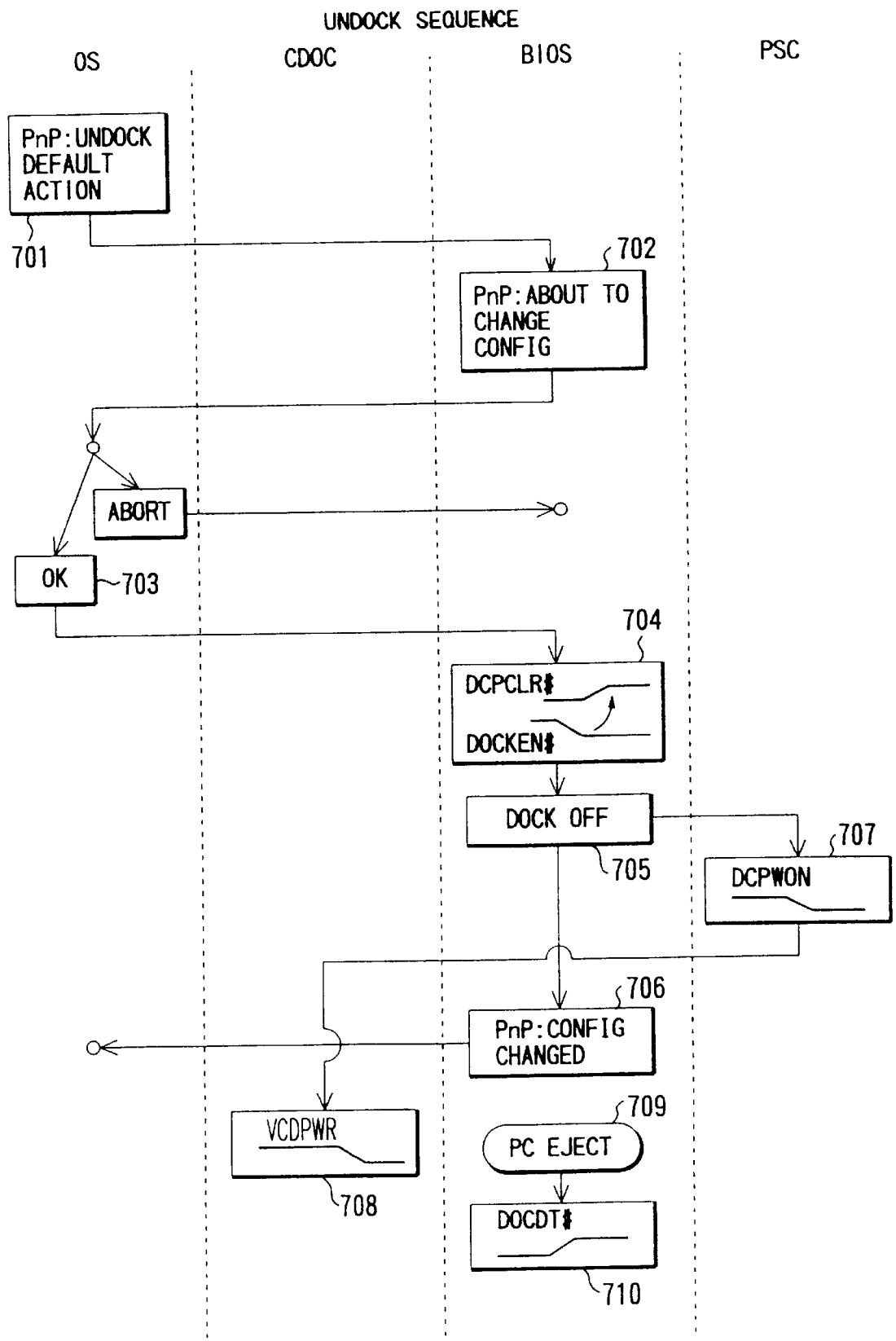
FIG. 12 is a view showing a first example of an undocking sequence when the main body is detached from the docking station in the computer system of the embodiment.

Referring to FIG. 12, after pressing of the ejecting button on the OS, an ejecting request is notified to the BIOS (701).

The BIOS asks the OS if a change in setting of the system environment will be possible. If possible, the PCI-DS bridge 18 is caused to turn OFF the gate with the docking bus 7 and a connection between the PCI bus 2 and the docking station 7 is disconnected (702 and 703). At the same time, the BIOS turns DCPCLR# and DOCKEN# active and inactive respectively and turns OFF the gate with the docking bus 7 in the card controller 41 (704).

Thereafter, the BIOS issues a command (Dock OFF) indicating disconnection of bus connection between the main body and the card dock 40 to the power source controller 24 and changes setting of the system environment in cooperation with the OS (705 and 706).

The power source controller 24 turns DCPWON inactive and thereby power for the card dock 40 is cut (707 and 708).

Then, the main body is ejected by means of the operation of the handle 401 by the user (709). DOCDT# is thus turned inactive (710).

Figure 13:
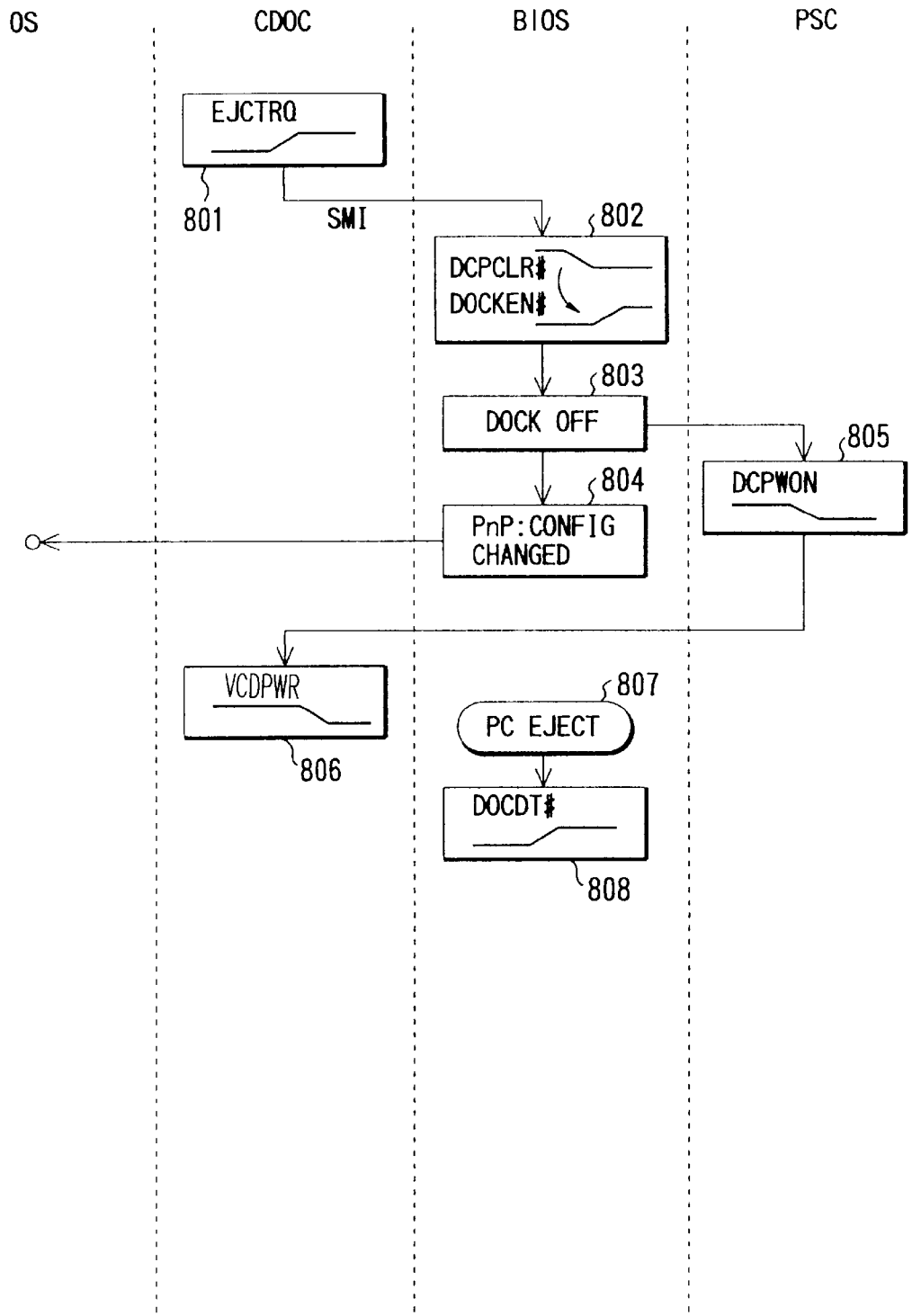
FIG. 13 is a view showing a second example of an undocking sequence when the main body is detached from the docking station in the computer system of the embodiment.

FIG. 13 illustrates the undocking sequence started by means of the operation of the handle 401 without using the ejecting button on the OS.

The instant that the handle 401 is even slightly raised by the user, a signal (EJCREQ) is produced from the detection switch 403 and transmitted to the I/O control gate array 23 (801). The I/O control gate array 23 notifies the CPU 11 of this through the SMI and then the BIOS is executed.

After notifying an application being executed of upcoming undocking, the BIOS sounds an alarm to the user by beeping. This is to indicate to the user that if the handle 401 continues to be raised, hanging up may occur immediately after ejection.

Then, the PCI-DS bridge 18 causes the gate to be switched to OFF with the docking bus 7 and the PCI bus 2 is separated from the docking bus 7. DCPCLR# and DOCKEN# are turned active and inactive respectively and the gate with the docking bus 7 in the card controller 41 is also switched OFF (802). If it is in this stage that the main body is actually ejected by means of the operation of the handle 401, no errors will occur.

Thereafter, the BIOS issues a command (Dock OFF) indicating disconnection of bus connection between the main body and the card dock 40 to the power source controller 24 and changes setting of the system environment in cooperation with the OS (803 and 804).

The power source controller 24 turns DCPWON inactive and thereby power for the card dock 40 is switched OFF (805 and 806).

Then, the user operates the handle 401 to eject the main body (807). DOCDT# is thus turned inactive (808).

Figure 14:
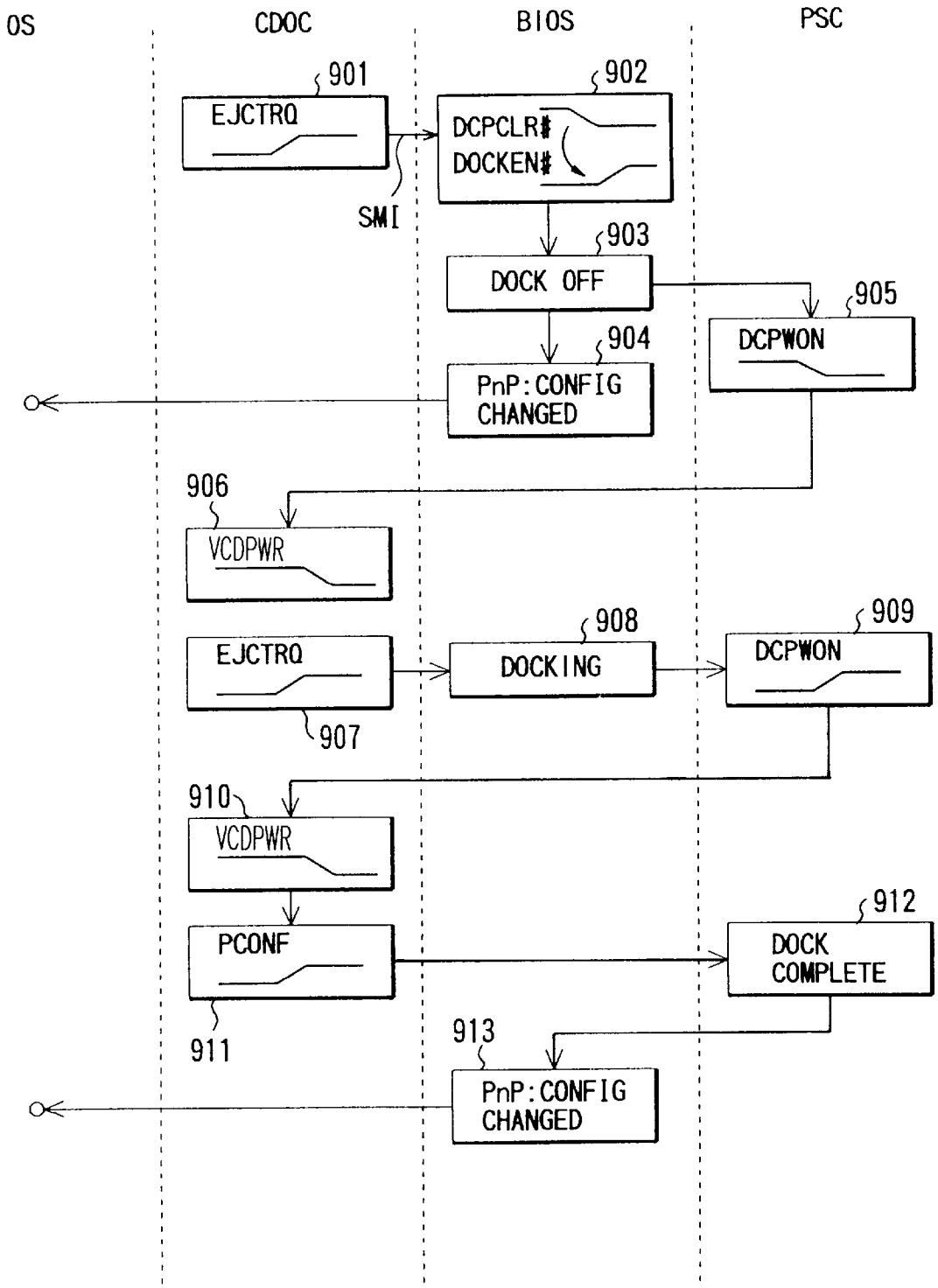
FIG. 14 is a view showing a third embodiment of an undocking sequence when the main body is detached from the docking station in the computer system of the embodiment.

FIG. 14 illustrates the case where the user returns the handle 401 in the middle of operation and ejection is not actually performed. Reference numerals 901 to 906 in FIG. 14 correspond to the reference numerals 801 to 806 of FIG. 13.

In the case where the user returns the handle 401 during operation and no ejection is actually carried out, bus disconnection between the main body and the card dock 40 by means of switching OFF of the gate and switching OFF of power for the card dock 40 are performed. However, since a signal (EJCREQ) is produced again from the detection switch 403 as a result of returning of the handle 401 during operation (907), the docking sequence is started in response to this.

More particularly, having received the signal (EJCREQ) from the detection switch 403, the I/O control gate array 23 notifies the CPU 11 of this through SMI and then the BIOS is executed. Having understood the returning of the handle 401 during operation from inactive DOCDT#, the BIOS issues a command (Docking) indicating physical connection between the docking connectors 10 of the main body and the card dock 40 to the power source controller (PSC) 24 (908).

The power source controller (PSC) 24 turns DCPWON to an inactive state and instructs the card dock 40 to switch the power ON (909). After the power has been switched ON for the card dock 40 in response to DCPWON and correctly supplied, PCONF is turned active (910 and 911).

Thereafter, upon confirming correct switching OFF of an internal power supply for the card dock 40 by means of PCONF, the power source controller (PSC) 24 issues a command (Dock Complete) indicating equivalence of power levels between the card dock 40 and the main body to the BIOS (912).

The BIOS causes the PCI-DS bridge 18 to switch ON the gate with the docking bus 7, interconnects the PCI bus 2 and the docking bus 7, simultaneously turns DOCKEN# and DCPCLR# active and interconnects the card controller 41 and the docking bus 7. Then, the BIOS performs environment setting for activating the docking station 30 or the card dock 40 in cooperation with the OS (913).

As discussed above, in hot docking with the card dock 40, an eject enable condition is also automatically set prior to actual ejection of the main body from the card dock 40. As a result, even while power for the main body is ON, hot undocking can be correctly performed without bringing about any problems due to hot swapping.

Figure 15:
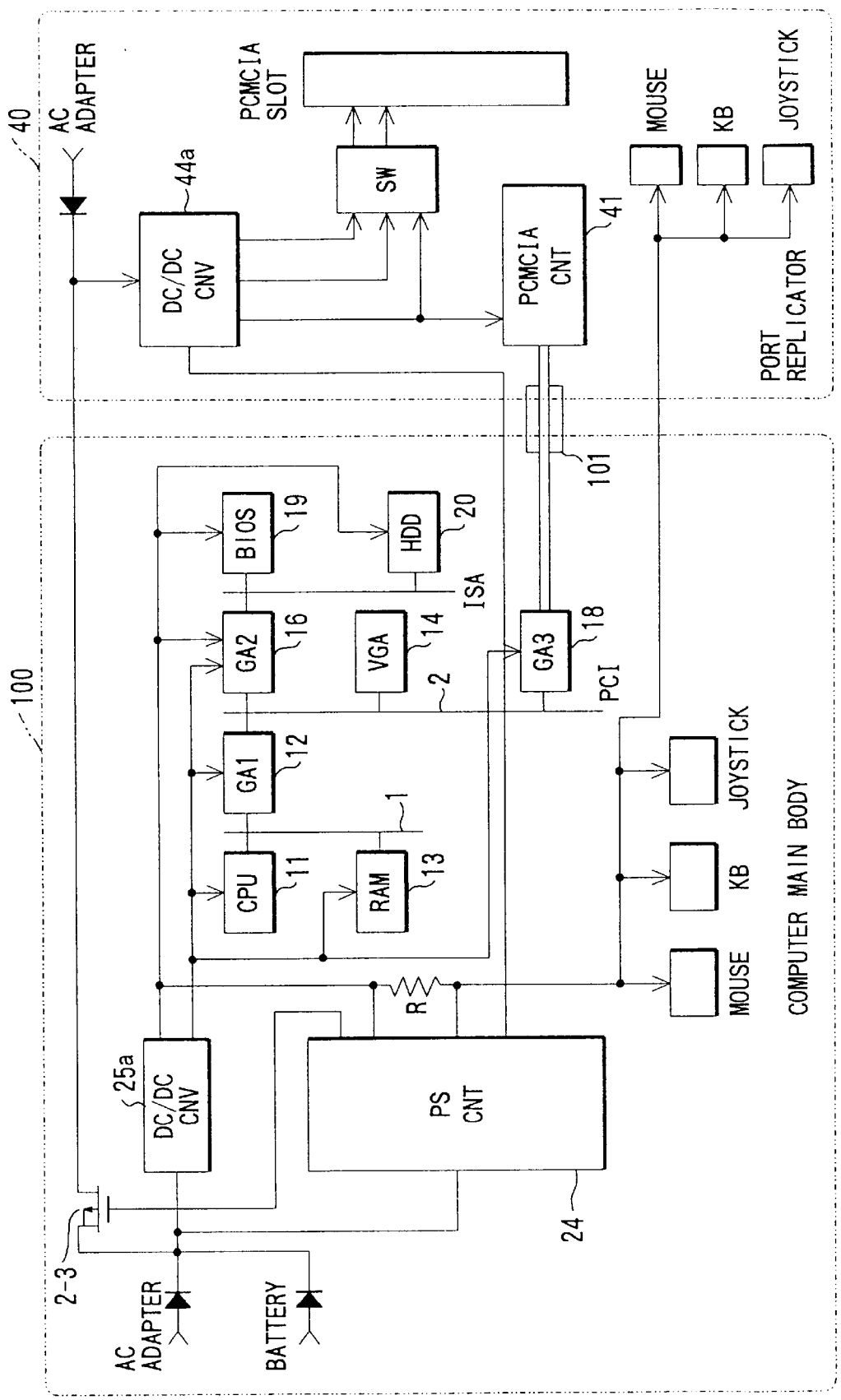
FIG. 15 is a view showing a hardware structure around a power source circuit with the main body attached to the card dock in the computer system of the embodiment.

FIG. 15 illustrates a circuitry around the power source devices of the main body 100 and the card dock 40.

As shown in the drawing, the card dock 40 is provided with a DC/DC converter 44*a*. This DC/DC converter 44*a* is connected to one power line drawn out of the AC adapter or the battery of the main body via the connector 10. The DC/DC converter 44*a* produces, from supplied voltages, driving power voltages of ±5V, ±12V and ±3.3V for the PC card slot and the PC card controller 41. The DC/DC converter 44*a* is controlled for its operation by the power source controller 24.

The card dock 40 is further provided with an AC adapter jack for connecting the AC adapter. Power lines from the AC adapter connected to the card dock 40 are commonly connected to the power line from the main body and power is supplied to the DC/DC converter 44*a*.

As noted above, the DC/DC converter 44*a* is provided inside the card dock 40 and a plurality of driving power voltages, ±5V, ±12V and ±3.3V, are produced from one power line from the main body. Therefore, it is possible to reduce the number of power lines drawn out of the main body to the card dock 40 and the size of the connector 10.

For example, it is assumed that a rate for one of a plurality of pins constituting the connector 10 is 400 mA. When a voltage of 5V is to be supplied from the main body 100 to the card dock 40, two pins are required because it is necessary to provide 600 mA. When a voltage of 3V is to be supplied, three pins are required because it is necessary to provide 1 A.

Therefore, by connecting the power lines from the AC adapter connected to the card dock 40 to the power line from the main body, a burden on the power supply (PS) 25 in the main body side can be reduced. Reduction in the burden on the power supply (PS) of the main body enables this power supply 25 to be made small, making it possible to improve portability required of the main body 100.

Moreover, since the power lines from the AC adapter connected to the card dock 40 are commonly connected to the power line from the main body, the card dock 40 and the main body can be driven by the battery of the main body and also by the power supply for the AC adapter connected to the card dock 40. Consequently, even when the AC adapter power supply is unexpectedly removed while the main body and the card dock 40 are used by means of the power source of the AC adapter connected to the card dock 40, the main body and the card dock 40 can be driven by means of the battery of the main body instead. This makes it possible to prevent various inconveniences due to unexpected removal of the AC adapter power supply.

In the main body, a switch circuit 2-3 constituted of a field-effect transistor (FET) is interposed in the power line drawn out to the card dock 40. This switch circuit 2-3 is controlled to be switched ON/OFF by the power source controller 24 such that this is switched ON only when the card dock 40 is in connection with the main body.

Furthermore, driving power supplies are provided from a DC/DC converter 25*a* in the computer to the mouse connector, the keyboard connector and the joystick connector provided in the main body and the card dock 40. A resistor R is, as shown in FIG. 15, interposed in the power line for providing these driving power supplies.

The power source controller 24 constantly monitors voltages in both ends of the resistor R and investigates a current value flowing to the power line. When this current value exceeds a prescribed value, the power source controller 24 prevents damage due to an excessive current by switching OFF power for the main body (or power for both of the main body and the card dock 40). Accordingly, it is possible to provide protection from an excessive current without using a fuse or a breaker.

As apparent from the foregoing, according to the invention, it is possible to attach/detach the main body to and from the expansion unit with power ON. It is also possible to efficiently reduce the number of power lines drawn from the main body to the expansion unit and to provide protection from an excessive current by improving the form of supplying power from the main body through the connectors to the expansion unit and the peripheral equipment.

In the embodiment, the PCI-ISA bridge 31 of the disk station 30 and the card controller 41 of the card dock 40 are constructed by the gate arrays. However, these may be constructed by switches.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:
   a computer main body; and
   an expansion unit attachable to said computer main body;
      said expansion unit including:
         at least one expansion device for expanding functions of said computer main body;
         an external bus connected to said at least one expansion device;
         a first connector; and
         a first switching means provided between said external bus and said first connector; and
      said computer main body including:
         a system bus;
         a second connector connectable to said first connector;
         second switching means provided between said system bus and said second connector;
         a control section for detecting whether said first connector and said second connector are connected; and
         power supply control means for enabling power supplying of said expansion unit when said control section detects that said first connector and said second connector are connected;
      wherein said control section switches on said first switching means and said second switching means respectively in order to electrically connect said system bus to said at least one expansion device by said external bus, after the power supplying of said expansion unit is effected, and outputs a signal indicating equivalence of power levels between the expansion unit and the computer main body.

2. A computer system according to claim 1, wherein said control section switches off said first switching means and said second switching means in response to an ejecting request for ejecting said computer main body from said expansion unit; and said power supply control means allows that the power supplying of said expansion unit is stopped, after said first and second switching means are switched off.

3. A computer system according to claim 1, wherein said expansion unit includes means for inputting an ejection request for ejecting said computer main body from said expansion unit, and for outputting the ejecting request to said control section; said control section switches off said first switching means and said second switching means in response to the ejecting request; and said power supply control means allows that the power supplying of said expansion unit is stopped, after said first and second switching means are switched off.

4. A computer system according to claim 1, wherein said computer main body includes input means for inputting an ejection request for ejecting said computer main body from said expansion unit; said control section switches off said first and second switching means in response to the ejection request input to said input means; and said power supply control means allows that the power supplying of said expansion unit is stopped, after said first and second switching means area switched off.

5. A computer system according to claim 1, wherein said control section detects connection between said first connector and said second connector in accordance with a voltage of a specified pin of said second connector.

6. A computer system according to claim 1, wherein said control section detects connection between said first connector and said second connector in response to switching on of said computer main body.

7. A computer system according to claim 1, wherein said computer main body includes means for setting a system environment which includes said computer main body and said expansion unit, after said system bus and said at least one expansion device are electrically connected together.

8. A computer system according to claim 2, wherein said computer main body includes means for setting a system environment of said computer main body after said system bus and said at least one expansion device are electrically separated from one another.

9. A computer system comprising:
   a computer main body; and
   an expansion unit attachable to and from said computer main body,
      said computer main body including:
         a first AC adapter connectable to an AC power supply;
         a battery;
         a first power line for applying a voltage from either said first AC adapter or said battery;
         a first DC/DC converter connected to said first power line, for generating a plurality of driving voltages for driving said computer main body, in accordance with the voltage supplied; and
         a first connector, and
      said expansion unit including:
         at least one expansion device for expanding functions of said computer main body;
         a second connector connectable to said first connector; and
         a second DC/DC converter connected to said first power line by said first and second connector, for generating a plurality of driving voltages for driving at said least one expansion device in accordance with the voltage applied from either said first AC adapter or said battery.

10. A computer system according to claim 9, wherein said expansion unit includes a second AC adapter to be connected to said AC power supply, and a second power line for applying a voltage output from said second AC adapter; and said second power line is connected to said first power line by said first and second connectors.

11. A computer system according to claim 10, wherein said computer main body includes a power supply controller for controlling said first DC/DC converter; a switch circuit is provided between said first connector of said first power line, and said AC adapter and said battery; and said power supply controller switches said switch circuit off when said computer main body is not attached to said expansion unit.

12. A computer system according to claim 11, wherein said switch circuit is composed of a field-effect transistor (FET).

13. A computer system comprising:
   a computer main body; and
   an expansion unit attachable to the computer main body;

said expansion unit including:
  at least one expansion device for expanding functions of the computer main body;
  a first connector;
  a first switching means provided between said at least one expansion device and said first connector;
  an ejecting mechanism for detaching said computer main body from said expansion unit when an operator operates a manual operating member;
  a detection circuit for detecting the operation of said manual operating member and outputting a detected signal; and
  power supply control means for controlling switching said expansion unit on and off in response to a command;
and said computer main body including:
  a system bus;
  a second connector connectable to said first connector;
  second switching means provided between said system bus and said second connector;
  detecting means for detecting whether said first connector and said second connector are connected;
  means for issuing an alarm to the operator in response to the detected signal supplied from said detection circuit;
  instructing means for outputting a command for instructing said power supply control means to switch on said expansion unit when said detecting means detects that said first connector and said second connector are connected; and
  connection control means for connecting electrically said system bus to said at least one expansion device, by respectively switching on said first switching means and said second switching means, when said expansion unit is switched on in response to the command from said instructing means, and for switching off said first and second switching means when the detected signal is maintained for a predetermined period after issuance of the alarm,
    wherein said instructing means outputs a command for instructing switching off of said expansion unit after said first and second switching means are switched off.

14. A computer system comprising:
a computer main body; and
an expansion unit attachable to said computer main body;
  said expansion unit including:
    at least one expansion device for expanding functions of said computer main body;
    an external bus connecting said at least one expansion unit;
    a first connector;
    a first switching means provided between said external bus and said first connector; and
    a power supply section;
  said computer main body including:
    a system bus;
    a second connector connectable to said first connector;
    second switching means provided between said system bus and said second connector;
    control section for detecting an eject request for ejecting said computer main body from said expansion unit, switching off, in response to the eject request, said first switching means and issuing a dock off command to said power supply control means; and
    power supply control means for disabling power supplying of said expansion unit, after said first switching means are switched off and inactivating a signal in response to the dock off command;
    wherein said power supply section stores the power supplying of said expansion unit in response to inactivation of the signal; and
    said computer main body is ejected from said expansion unit after the power supply section stops the power supplying of the expansion unit.

15. A computer system according to claim 14, wherein
said power supply section detects the eject request according to activation of a first signal and issues an eject command to said power supply control means,
said power supply control outputs the eject request to said control section in response to the eject command,
said control section switches off, in response to the eject request, said first switching means by inactivating a second signal and by activating a third signal, and issues an eject power on command to said power supply control means,
said power supply control means inactivates a fourth signal in response to the eject power on command and outputs a second eject request,
said power supply section stops the power supplying of said expansion unit in response to inactivation of the fourth signal, and
said computer main body is ejected from said expansion unit after said power supply section stops the power supplying of said expansion unit.

16. A computer system according to claim 14, wherein said control section determines, in response to the eject request, whether or not a system configuration of said computer system is changeable, switches off said first switching means by inactivating a second signal and by activating a third signal when said control section determines that the system configuration is changeable, and sets the system configuration of said computer system.

17. A computer system according to claim 14, wherein said control section determines, in response to the eject request, whether or not a system configuration of said computer system is changeable, switches off said first switching means by inactivating a second signal and by activating a third signal when said control section determines that the system configuration is changeable, and sets the system configuration of said computer system.

18. A computer system according to claim 14, wherein said expansion unit includes means for inputting an ejection request for ejecting said computer main body from said expansion unit and for transmitting the ejection request to said control section.

19. A computer system according to claim 14, wherein said computer main body includes means for inputting an ejection request for ejecting said computer main body from said expansion unit and for transmitting the ejection request to said control section.

20. A computer system comprising:
a computer main body; and
an expansion unit attachable to said computer main body;
  said expansion unit including:
    at least one expansion device for expanding functions of said computer main body;
    an external bus connected to said at least one expansion device;
    a first connector;
    a first switching means provided between said external bus and said first connector; and a power supply section which supplies power to said at least one expansion device and said first switching means in response to activation of a second signal and activates a third signal after the power is supplied; and said computer main body including:

a system bus;

a second connector connectable to said first connector;

second switching means provided between said system bus and said second connector;

a control section for detecting whether said first connector and said second connector are connected and outputting a first signal to power supply control means; and the power supply control means, receiving the first signal from the control section, for enabling power supplying of said expansion unit when said control section detects that said first connector and said second connector are connected and for activating the second signal in response to the first signal, and for determining that the power is supplied in said expansion unit by detecting activation of the third signal and for issuing a dock complete command to said control section;

wherein said control section switches on, in response to the dock complete command, said first switching means and issues a dock on command to said power supply control means in order to notice that said system bus is electrically connected to said at least one expansion device by said external bus.

21. A method for connecting an expansion unit to a computer main body, the expansion unit having an expansion device, an external bus connected to the expansion device, a first connector, and a first switch circuit provided between the external bus and the first connector, and the computer main body having a system bus, a second connector, a second switch circuit provided between the system bus and the second connector, and a power supply controller, the method comprising the steps of:

detecting whether or not the first connector and the second connector are connected;

enabling power supplying of the expansion unit when the detecting step detects that the first connector and the second connector are connected;

switching on the first switch circuit and the second switch circuit respectively in order to electrically connect the system bus to the expansion device by said external bus, after the power supplying of the expansion unit is effected; and outputting a signal indicating equivalence of power levels between the expansion unit and the computer main body.

22. A method for connecting an expansion unit to a computer main body, the expansion unit including an expansion device, an external bus connected to the expansion device, a first connector, and a first switching circuit, and the computer main body including a system bus, a second connector connectable to the first connector, a second switching circuit, and a power supply controller, the method comprising the steps of:

detecting whether or not the first connector and the second connector are connected according to activation of a first signal and outputting a second signal to the power supply controller;

enabling power supplying of the expansion unit upon detecting that the first connector and the second connector are connected and activating a third signal in response to the second signal;

supplying power to the expansion device and the first switching circuit in response to the activation of the third signal and activating a fourth signal after the power is supplied;

determining that power is supplied in the expansion unit by detecting activation of a fourth signal and issuing a dock complete command;

switching on, in response to the dock complete command, the first switching means by activating a fifth signal and issuing a dock on command in order to notice that the system bus is electrically connected to the expansion device by the external bus.

23. A method for ejecting a computer main body from an expansion unit, the expansion unit including an expansion device, an external bus connected to the expansion device, a first connector, a first switching circuit, and a power supply circuit, and the computer main body including a system bus, a second connector connectable to the first connector, and a second switch circuit, the method comprising the steps of:

detecting an eject request for ejecting the computer main body from the expansion unit;

switching off, in response to the eject request, the first switching means and the second switching means by inactivating a first signal and by activating a second signal and issuing a dock off command;

disabling power supplying of the expansion unit, after the first and second switch circuits are switched off, and inactivating a third signal in response to the dock off command;

stopping the power supplying of the expansion unit in response to inactivation of the third signal;

ejecting the computer main body from the expansion unit thereby inactivating a fourth signal.

* * * * *